US012454851B2

(12) United States Patent
Trivelpiece et al.

(10) Patent No.: US 12,454,851 B2
(45) Date of Patent: Oct. 28, 2025

(54) MULTI-TAG ARTICLE SECUREMENT

(71) Applicant: Sensormatic Electronics, LLC, Boca Raton, FL (US)

(72) Inventors: Steve E. Trivelpiece, Rancho Santa Margarita, CA (US); Adam S. Bergman, Boca Raton, FL (US); Iraj Ehtezazi Alamdari, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 48 days.

(21) Appl. No.: 18/647,860

(22) Filed: Apr. 26, 2024

(65) Prior Publication Data

US 2024/0360702 A1 Oct. 31, 2024

Related U.S. Application Data

(60) Provisional application No. 63/462,907, filed on Apr. 28, 2023.

(51) Int. Cl.
*E05B 73/00* (2006.01)
*B65C 5/00* (2006.01)
(Continued)

(52) U.S. Cl.
CPC ............ *E05B 73/0017* (2013.01); *B65C 5/00* (2013.01); *B65C 7/00* (2013.01); *G09F 3/0288* (2013.01);
(Continued)

(58) Field of Classification Search
CPC ......... E05B 73/0017; B65C 5/00; B65C 7/00; G09F 3/0288; G09F 2003/0214; G09F 2003/0257; G09F 2003/0282
(Continued)

(56) References Cited

U.S. PATENT DOCUMENTS 1,679,699 A * 8/1928 Wright ...................... G09F 3/14 40/672
3,228,129 A * 1/1966 Dover ...................... G09F 3/10 283/80
(Continued)

FOREIGN PATENT DOCUMENTS

EP 2746986 A1 6/2014
EP 3509016 A1 7/2019
(Continued)

OTHER PUBLICATIONS

International Search Report and Written Opinion received for PCT Patent Application No. PCT/US2024/011524, mailed on May 16, 2024, 17 pages.
(Continued)

*Primary Examiner* — Nathan Cumar
(74) *Attorney, Agent, or Firm* — ArentFox Schiff LLP

(57) ABSTRACT

A secured article may include a tag set comprising a first tag and a second tag, each tag attached to the article. A secured article may include a disablement structure. A secured article may include attached to the article in physical proximity to the first tag. A secured article may include in electromagnetic relationship with the second tag. A secured article may include disabling operation of the second tag absent altering the electromagnetic relationship.

34 Claims, 14 Drawing Sheets

400

(Side View)

600

(51) Int. Cl.
*B65C 7/00* (2006.01)
*G09F 3/02* (2006.01)

(52) U.S. Cl.
CPC ................ *G09F 2003/0214* (2013.01); *G09F 2003/0257* (2013.01); *G09F 2003/0282* (2013.01)

(58) Field of Classification Search
USPC .............................................................. 70/57
See application file for complete search history.

(56) References Cited

U.S. PATENT DOCUMENTS 5,074,594 A * 12/1991 Laganowski ............. G09F 3/02 283/81
5,390,434 A * 2/1995 Lockard .................... G09F 3/02 40/310
5,423,139 A * 6/1995 Feldman ............... G09F 3/0288 283/105
7,388,503 B2 * 6/2008 Posamentier .... G06K 19/07327 340/572.1
7,669,765 B2 * 3/2010 Harper ..................... G07C 9/28 340/572.1
7,994,924 B2 * 8/2011 Brandt ................. H01Q 1/2216 340/572.1
8,102,264 B2 * 1/2012 Rinkes ................. G06Q 20/203 705/28
8,395,508 B2 * 3/2013 Burnside .............. G06Q 10/087 340/568.1
8,416,079 B2 * 4/2013 Roesner ........... G06K 19/07345 235/382
8,531,396 B2 * 9/2013 Underkoffler ........ G06V 40/107 345/158
9,117,154 B2 * 8/2015 Enyedy ................ B23K 9/1006
9,911,020 B1 * 3/2018 Liu .................... G06K 7/10366
10,255,777 B1 * 4/2019 Soto ..................... G08B 13/242
10,290,031 B2 * 5/2019 Reid ...................... A61B 5/117
10,325,464 B1 * 6/2019 Trivelpiece .......... G06Q 20/206
10,380,857 B1 * 8/2019 Bergman ........... G08B 13/2417
10,431,062 B1 * 10/2019 Bergman ........... G08B 13/2454
10,930,179 B2 * 2/2021 Horne ........................ G09F 3/02
11,068,674 B1 * 7/2021 Rmili ................... G06K 19/067
11,127,317 B2 * 9/2021 Corbett ................ B65D 25/205
2005/0236489 A1 * 10/2005 Droz ................ G06K 19/07327 235/487
2006/0214792 A1 * 9/2006 Goyal .................. G06Q 10/087 340/572.1
2006/0273910 A1 * 12/2006 Narlow .............. G08B 13/2471 340/572.7
2006/0290501 A1 * 12/2006 Hammad ............. G06K 19/005 340/572.1
2008/0186186 A1 * 8/2008 Campbell ............ G06K 19/025 340/572.8
2008/0297310 A1 * 12/2008 Onderko .......... G06K 19/07327 340/10.1
2011/0199189 A1 * 8/2011 Eluard ................. G11B 23/284 340/10.5
2011/0273360 A1 * 11/2011 Campero ............... H01Q 5/307 343/893
2011/0303559 A1 * 12/2011 Michel ................. B65D 5/2057 40/299.01
2012/0018504 A1 * 1/2012 Jiang ................ G06K 19/07749 235/375
2013/0120117 A1 * 5/2013 Nyalamadugu .... G06K 19/0739 340/10.1
2013/0219759 A1 * 8/2013 Kimes .................... B31D 1/027 40/6
2013/0223673 A1 * 8/2013 Davis ...................... G06F 3/147 235/375
2013/0284806 A1 * 10/2013 Margalit .............. G07G 1/0009 235/382
2014/0070008 A1 * 3/2014 Kane ..................... G09F 3/0297 235/488
2014/0111338 A1 * 4/2014 Bergman ........... G08B 13/2468 340/572.7
2014/0239076 A1 * 8/2014 Chakravarty .... G06K 19/07754 29/601
2014/0253333 A1 * 9/2014 Patterson ............ E05B 73/0064 340/572.4
2015/0147491 A1 * 5/2015 De Backer ............ G09F 3/0288 156/230
2017/0069185 A1 * 3/2017 Bergman ............. G08B 13/242
2018/0211718 A1 * 7/2018 Heath ..................... G16H 80/00
2019/0026620 A1 * 1/2019 Barney ............ G06K 19/07345
2019/0197853 A1 * 6/2019 Trivelpiece ........ G06K 19/0723
2019/0304277 A1 * 10/2019 Bergman ........... G08B 13/2425
2020/0042754 A1 * 2/2020 Trivelpiece ........ G06K 7/10366
2020/0285821 A1 * 9/2020 Chandramowle .... G06K 19/027
2021/0082266 A1 * 3/2021 Chandramowle .... G08B 13/248
2021/0121622 A1 * 4/2021 Bone ..................... A61M 39/08
2022/0084380 A1 * 3/2022 Trivelpiece ........ G06K 19/0716
2022/0171950 A1 * 6/2022 Bergman ........... G08B 13/2417
2022/0230040 A1 * 7/2022 Bergman ......... G06K 19/07773
2023/0106047 A1 * 4/2023 Saarloos .................. G07C 9/29 705/23

FOREIGN PATENT DOCUMENTS

EP 4220609 A1 8/2023
JP 2005-309612 A 11/2005
WO 2021/067197 A1 4/2021
WO 2021/186149 A1 9/2021
WO 2022/065159 A1 3/2022

OTHER PUBLICATIONS

International Search Report and Written Opinion received for PCT Patent Application No. PCT/US2024/026690, mailed on Jul. 18, 2024, 15 pages.
Otzurk, et al., Gait-based people Identification with Millimeter-Wave Radio, 2021 IEEE 7th World Forum on Internet ofThings (WF-IoT) 978-1-6654-4431-6/21, Jun. 14, 2021, pp. 391-396.

* cited by examiner

100

400

(Side View)

(Top View)

600

1400

MULTI-TAG ARTICLE SECUREMENT

CROSS-REFERENCE TO RELATED APPLICATION

This application claims the benefit of U.S. Provisional Application No. 63/462,907, entitled as "MULTI-TAG ARTICLE SECUREMENT," and filed Apr. 28, 2023; the contents of which are hereby incorporated herein by reference in their entirety.

FIELD OF THE DISCLOSED TECHNOLOGY

The present disclosure relates generally to securing article, and more specifically, to the use of multiple tags and a disablement structure to secure articles.

SUMMARY OF THE INVENTION

The disclosed aspects will hereinafter be described in conjunction with the appended drawings, provided to illustrate and not to limit the disclosed aspects, wherein like designations denote like elements.

In some aspects, the techniques described herein relate to a secured article, including: a tag set including a first tag and a second tag, each tag attached to the article; a disablement structure: attached to the article in physical proximity to the first tag, in electromagnetic relationship with the second tag, and disabling operation of the second tag absent altering the electromagnetic relationship.

In some aspects, the techniques described herein relate to a secured article, wherein at least one tag is embedded in the article. In some aspects, the techniques described herein relate to a secured article, wherein the physical proximity includes the disablement structure and the first tag being one or more of overlapping and intersecting. In some aspects, the techniques described herein relate to a secured article, wherein the disablement structure and the first tag are attached to a label of the article. In some aspects, the techniques described herein relate to a secured article, wherein: the first tag is embedded in the article; the disablement structure includes a conductive thread substantially around the first tag; and the electromagnetic relationship includes the conductive thread in electrical connection with the second tag disabling the second tag. In some aspects, the techniques described herein relate to a secured article, wherein the disablement structure includes a radio-frequency shielding layer. In some aspects, the techniques described herein relate to a secured article any, wherein physical proximity includes the disablement structure being i) substantially coextensive with the first tag and ii) inseparable from the first tag without disablement of the first tag and the disablement structure. In some aspects, the techniques described herein relate to a secured article, wherein the second tag is a radio frequency identification (RFID) tag. In some aspects, the technology described herein relates to a secured article in which the disablement structure comprises a metal structure that electromagnetically couples at least one of inductively and capacitively to the second tag to impede the operation of the second tag via changing an impedance of the second tag.

In some aspects, the techniques described herein relate to an article security kit, including: a first tag configured to attach to an article; a second tag configured to attach to the article; and a disablement structure configured to attach to the article: in electromagnetic relationship with the second tag disabling operation of the second tag absent altering the electromagnetic relationship, and in proximity to the first tag such that one or more of i) physical damage to the first tag rendering the first tag inoperable, and ii) removal of the first tag from the article, discontinues the electromagnetic relationship between the disablement structure and the second tag.

In some aspects, the techniques described herein relate to a kit, wherein at least one tag is embedded in the article. In some aspects, the techniques described herein relate to a kit, wherein the physical proximity includes the disablement structure and the first tag being one or more of overlapping and intersecting. In some aspects, the techniques described herein relate to a kit, wherein the disablement structure and the first tag are attached to a label of the article. In some aspects, the techniques described herein relate to a kit, wherein: the first tag is embedded in the article; the disablement structure includes a conductive thread substantially around the first tag; and the electromagnetic relationship includes the conductive thread in electrical connection with the second tag disabling the second tag. In some aspects, the techniques described herein relate to a kit, wherein the disablement structure includes a radio-frequency shielding layer. In some aspects, the techniques described herein relate to a kit any, wherein physical proximity includes the disablement structure being i) substantially coextensive with the first tag and ii) inseparable from the first tag without disablement of the first tag and the disablement structure. In some aspects, the techniques described herein relate to a kit, wherein the second tag is a radio frequency identification (RFID) tag.

In some aspects, the techniques described herein relate to a method including: providing a kit including: a first tag configured to attach to an article; a second tag configured to attach to the article; and a disablement structure configured to attach to the article: in electromagnetic relationship with the second tag disabling operation of the second tag absent altering the electromagnetic relationship, and in proximity to the first tag such that one or more of i) physical damage to the first tag rendering the first tag inoperable, and ii) removal of the first tag from the article, discontinues the electromagnetic relationship between the disablement structure and the second tag; and attaching the first tag and the disablement structure to the article, the disablement structure in proximity to the first tag; and attaching the second tag in electromagnetic relationship with the disablement structure, disabling operation of the second tag absent altering the electromagnetic relationship.

In some aspects, the techniques described herein relate to a method, wherein at least one tag is embedded in the article. In some aspects, the techniques described herein relate to a method, wherein the physical proximity includes the disablement structure and the first tag being one or more of overlapping and intersecting. In some aspects, the techniques described herein relate to a method, wherein the disablement structure and the first tag are attached to a label of the article.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
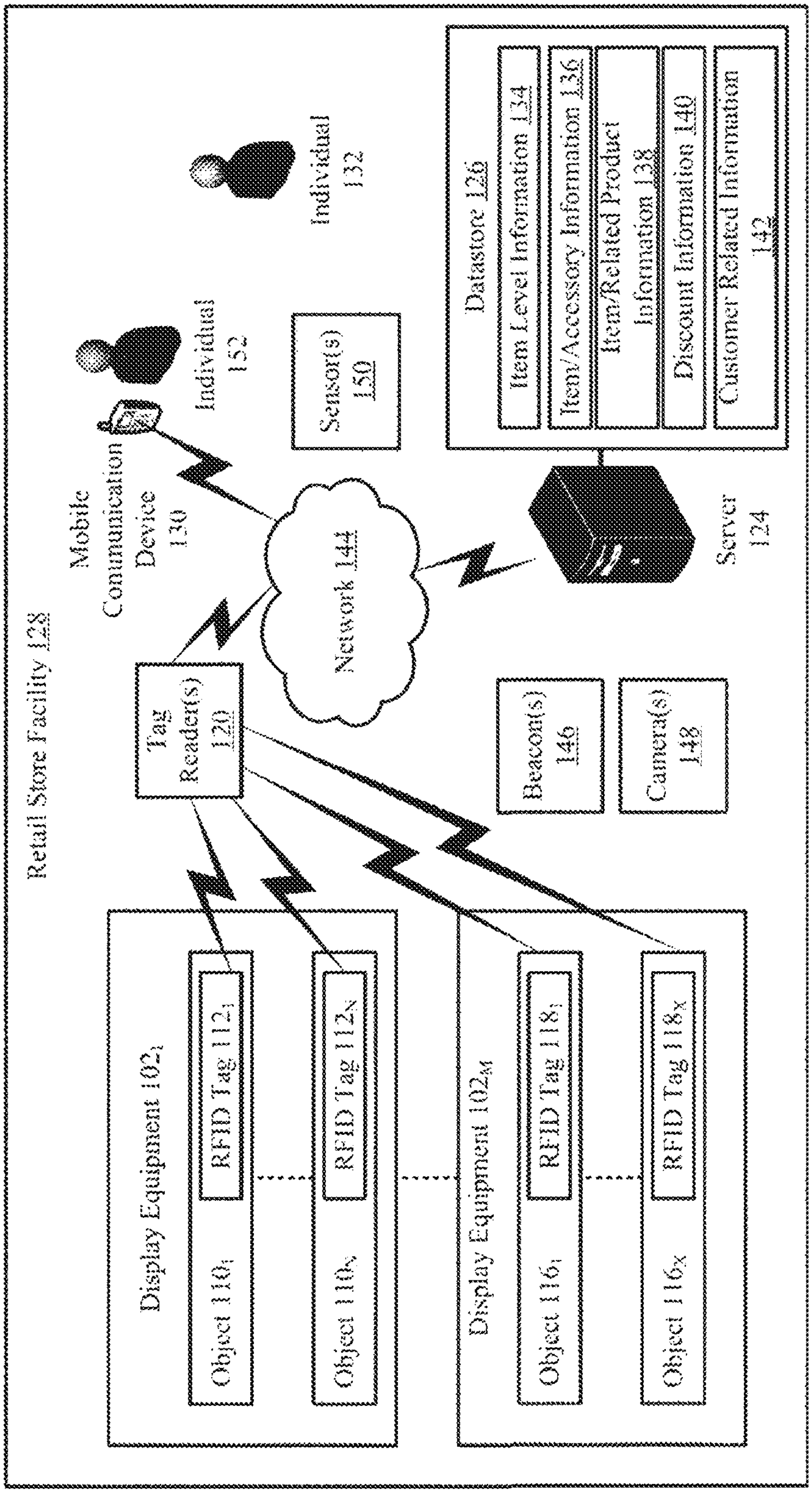
FIG. 1 is an illustration of an architecture for a system, according to examples of the technology disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Electronic Article Surveillance (EAS) systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with a security tag (such as an RFID and/or an acousto-magnetic (AM) tag), also known as an EAS marker, that, when active, generates a response signal when passed through this interrogation zone. An antenna and receiver in the same or another "pedestal" detects this response signal and generates an alarm.

Additionally, permanent hidden/embedded tags in goods could be used for other purposes, such as, but not limited to circular economy applications (new business models like renting clothes, or selling secondhand clothes with known authenticity and pedigree). In many cases the same tag can be used for multiple purposes: security (anti-theft) circular economy, supply chain management and inventory management.

One drawback of tagging goods with EAS markers and other security tags for purposes of theft prevention is that the tag itself is often visible to thieves. Shoplifters in many cases are able to locate the EAS marker and simply remove, disable, or shield an EAS marker element to evade detection by the detection system.

In some cases, a security tag, such as a passive RFID tag, which is designed to be physically capable of withstanding a variety of the tensile and abrasive forces which occur while positioning the security tag into a sewn item can be used. The security tag, which optionally may be flexible and water-resistant, is configured to be incorporated into an interface between different layers of a textile item, such as a garment or article of clothing. Moreover, the security tag can be discreetly disposed within the item so as to be concealed from view.

A company or a retailer puts an RFID tag onto an item for inventory and theft detection. One method would be to attach an RFID tag onto the brand label and then sew or attach that label to the garment. But this method could be used for other locations on the garment where an RFID tag is attached. If the thief grabs the items on the shelf and walks out the exit of the store, then RFID readers placed at the exit location can detect the appearance of this RFID tag and sound an alarm if the garment with that unique tag was not purchased. However, if the thief takes the item into a fitting room, bathroom, corner, or some area out of sight of store personnel and cameras, then they can cut the label or remove the sewing thread. If they do this, then the tag will not be detected at the exit gate when they leave.

Examples of the technology disclosed herein involves having multiple RFID tags attached to/embedded in the garment or brand label. Examples of the technology disclosed herein include either one of these tags starting to function when the brand label is altered, or both are functioning, and one will stop functioning when the brand label is altered. There are a few different ways that this method can be accomplished.

In some examples, RFID readers are placed in the areas of interest, to determine when new tags arrive at this area. For this example, assume the area is a fitting room. If the tag stops being read, then the technology can alert the store security personnel that the item with that unique tag might be being stolen. If that tag reappears at the exit to the fitting room, the technology can inform the personnel that the alarm was canceled. The technology can deliver a picture and description of the item to the store security personnel. If security personnel see that item appear at the exit to the fitting room or at the exit of the store, they can stop the thief and examine the item to see if the tag was altered and if the item was purchased. One drawback is that sometimes garments are held such that the RFID tags on them cannot be read.

In some examples, the technology includes using a metalized thread that is attached to the antenna structure of the RFID tag such that the tag is detuned and will function poorly or not at all until the thread is cut. For example, attaching a label on the outside edge by sewing in metalized thread, then the thief cannot remove the label without removing the metalized thread. When the thread is removed or cut then the second RFID tag will begin functioning. The RFID reader detecting this tag will sound an alarm and alert the store security personnel. The technology can use a unique tag ID on the tag that will appear. This will allow the tag readers to detect a possible theft any time they see this unique tag ID or range of tag IDs appears. This approach can have both tags located on the brand label.

The technology can improve the theft detection by attaching the second RFID tag to the garment directly under the brand label. A disablement structure on the brand label above the tag can be used to detune or shield the RFID tag such that it functions poorly or not at all, until the brand label above it is cut or removed. Such a tag can be created by sewing in metal thread that is attached to the tag below, or metal areas that shield the tag below. When the brand label is cut or removed, then the tag below starts functioning. When this unique tag ID is detected then the technology informs security personnel that a theft event is in process near the reader that detected this RFID tag. If the first tag disappears at this time, then the technology can inform the security personnel what item is being stolen.

There are multiple ways to attach the second tag. As a first example, the second tag can be sewn into the brand label. As another example, the second tag can be attached using double-sided sticky tape. The tape would be stronger on the side touching the garment. Then if the brand label is removed the tag will remain attached to the garment. As a third example, the RFID tag is sewn into the garment directly below the brand label. Then when the brand label is removed, the thief would not see anything and would not be aware that they have enabled the second tag to be read. In yet another example, there is a second tag on the item that is always visible. But if both tags cannot be read, then we assume that a thief has altered one of them. In some examples, the disablement structure comprises a metal structure that electromagnetically couples at least one of inductively and capacitively to the second tag to impede the operation of the second tag via changing an impedance of the second tag In some examples, the technology includes methods for use in an article having attached thereto a first tag and a second tag. Such examples include inhibiting operation of the second tag while the first tag remains in operation. Such examples include un-inhibiting operation of the second tag upon the first tag becoming inoperable.

Turning now to the figures, example aspects are depicted with reference to one or more components described herein, where components in dashed lines may be optional.

Referring now to FIG. 1, there is provided a schematic illustration of an illustrative system 100 that is useful for understanding the technology disclosed herein. The technology is described herein in relation to a retail store environment. The technology disclosed herein is not limited in this regard and can be used in other environments. For example, the technology can be used in distribution centers, factories, and other commercial environments. Notably, the technology can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment 102 (e.g., $\mathbf{102}_1$-$\mathbf{102}_M$) is disposed. The display equipment 102 is provided for displaying objects 110 (or items, e.g., $\mathbf{110}_1$-$\mathbf{110}_N$), and objects 116 (e.g., $\mathbf{116}_1$-$\mathbf{116}_X$) to customers of the retail store. The display equipment 102 can include, but is not limited to, shelves, article display cabinets, promotional displays, fixtures, and/or equipment securing areas of the RSF 128. The RSF 128 can also include emergency equipment (not shown), checkout counters, video cameras, people counters, and conventional EAS systems well known in the art, and therefore will not be described herein.

At least one tag reader 120 is provided to assist in counting and tracking locations of the objects 110 and objects 116 within the RSF 128. The tag reader 120 comprises an RFID reader configured to read RFID tags.

RFID tags $\mathbf{112}_1$-$\mathbf{112}_N$, $\mathbf{118}_1$-$\mathbf{118}_X$ are respectively inserted into the objects $\mathbf{110}_1$-$\mathbf{110}_N$, $\mathbf{116}_1$-$\mathbf{116}_X$ as described below. This insertion is achieved via an insertion tool, and/or special cuts or notches designed into the garment to improve the case of inserting, and/or a structural configuration of the RFID tag to enable the insertion. The RFID tags $\mathbf{112}_1$-$\mathbf{112}_N$, $\mathbf{118}_1$-$\mathbf{118}_X$ can alternatively or additionally comprise dual-technology tags that have both EAS and RFID capabilities as described herein. In examples of the technology disclosed herein, the elements of an RFID tag are inserted into an article, for example into an interface between layers of the fabric/cloth of the article, which may be clothing, or which may be another retail item, such as a handbag, a backpack, and the like.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $\mathbf{110}_1$-110N, $\mathbf{116}_1$-$\mathbf{116}_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). In accordance with some examples, the MCD 130 has a software application installed thereon that is operative to: facilitate the provision of various information 134-142 to the individual 152 and/or to facilitate a purchase transaction.

The MCD 130 is generally configured to provide a visual and/or auditory output of item level information 134, accessory information 136, related product information 138, discount information 140, and/or customer related information 142.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the RSF 128 as shown in FIG. 1 or remote from the RSF 128. It should be understood that server 124 is configured to: write data to and read data from datastore 126, RFID tags $\mathbf{112}_1$-$\mathbf{112}_N$, $\mathbf{118}_1$-$\mathbf{118}_X$, and/or MCD 130; perform language and currency conversion operations using item level information 134 and/or accessory information 136 obtained from the datastore 126, RFID tags $112_1$-$112_N$, $118_1$-$118_X$, and/or MCD 130 perform data analytics based on inventory information 134, tag read information, MCD tacking information, and/or information 134-142; perform image processing using images captured by camera(s) 148; and/or determine locations of RFID tags $112_1$-$112_N$, $118_1$-$118_X$ and/or MCDs 130 in the RSF 128 using beacon(s) 146, tag reader 120 or other devices having known locations and/or antenna patterns.

In some examples, one or more beacons 146 transmitting an RF signal (e.g., a second RF signal that is non-RFID) other than the RFID interrogation signal are placed to cover a zone of interest also covered by a tag reader 120 placed to cover an RFID interrogation zone, e.g., at a portal of the RSF 128. The system 100 can detect and derive any number of relevant indicators based on second RF signal. The tag 112/118 response to the second RF signal is analyzed and compared to data collected by the RFID signal response that occurred concurrently with the tag's passage through the portal.

The server 124 facilitates, updates the information 134-142 output from the MCD 130. Such information updating can be performed periodically, in response to instructions received from an associate (e.g., a retail store employee 132), in response to a detected change in the item level information 134, accessory information 136 and/or related product information 138, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag 112/118. The sale price is then output from the MCD 130. The technology disclosed herein is not limited to the particulars of this example.

Although a single MCD 130 and/or a single server 124 is (are) shown in FIG. 1, the technology disclosed herein is not limited in this regard. It is contemplated that more than one computing device can be implemented. In addition, the technology disclosed herein is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information 134 includes, but is not limited to, first information indicating that an RFID tag 112/118 is in motion or that an object is being handled by an individual 152, second information indicating a current location of the RFID tag 112/118 and/or the MCD 130, third information indicating an accessory or related product of the object to which the moving RFID tag is coupled, and/or fourth information indicating the relative locations of the accessory and the moving RFID tag 112/118 and/or the relative locations of the related product and the moving RFID tag 112/118. The first, second and fourth information can be derived based on sensor data generated by sensors local to the RFID tag. Accordingly, the RFID tags 1121-112N, 1181-118X include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server 124 (a) detection of when the individual 152 enters the RSF 128, (b) tracking of the individual's movement through the RSF 128, (c) detection of when the individual 152 is in proximity to an object to which an RFID tag 112/118 is coupled, (d) determination that an RFID tag 112/118 is being handled or moved by the individual 152 based on a time stamped pattern of MCD 130 movement and a timestamped pattern of RFID tag 112/118 movement, and/or (e) determination of an association of moving RFID tags 112/118 and the individual 152.

When a detection is made that an RFID tag 112/118 is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag 112/118 is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information 134, accessory information 136, and/or related product information 138.

In those or other scenarios, a sensor embedded in the RFID tag 112/118 detects when an individual 152 is handling the object in which the RFID tag 112/118 is inserted. When such a detection is made, the RFID tag 112/118 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information related to the product of interest. The technology disclosed herein is not limited to the particulars of this scenario.

Figure 2:
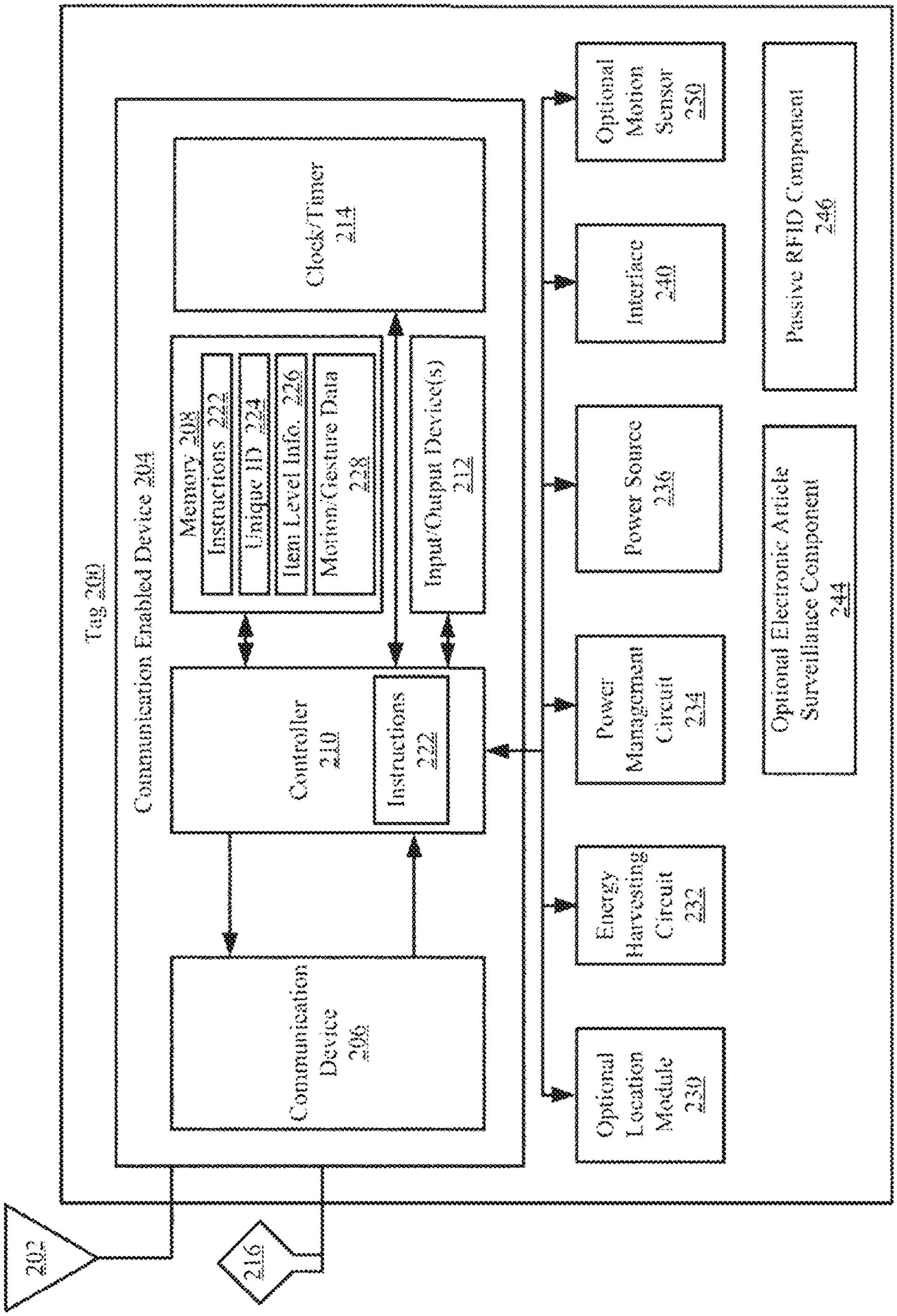
FIG. 2 is an illustration of an architecture for a security tag, according to examples of the technology disclosed herein.

Referring now to FIG. 2, there is an illustration of an illustrative architecture for a security tag 200. RFID tags $112_1$-$112_N$, $118_1$-$118_X$ are the same as or similar to security tag 200. As such, the discussion of security tag 200 is sufficient for understanding the RFID tags $112_1$-$112_N$, $118_1$-$118_X$ of FIG. 1. In some implementations, security tag 200 may be configured to perform operations such as but not limited to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The security tag 200 can include more or less components than that shown in FIG. 2. However, the components shown are sufficient to disclose an illustrative aspect implementing the technology disclosed herein. Some or all of the components of the security tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 is representative of a security tag 200 configured to facilitate improved inventory management/surveillance and customer experience. In this regard, the security tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a RFID technology, a Near Field Communication ("NFC") technology, and/or a Short-Range Communication ("SRC") technology. For example, one or more of the following wireless communication technologies (is) are employed: Radio Frequency ("RF") communication technology; Bluetooth technology (including Bluetooth Low Energy (LE)); Wi-Fi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204 and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, Wi-Fi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, Wi-Fi, LiFi, etc. tag) can be assigned at the deployment thereof. If the user desires to use another protocol later, the user can remotely change the communication protocol of the deployed security tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or object 116 of FIG. 1) in which the security tag 200 is inserted.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the security tag 200 can include additional sensors not shown in FIG. 2.

The communication enabled device 204 also facilitates the automatic and dynamic modification of item level information 226 that is being or is to be output from the security tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the security tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device 206 (e.g., transceiver) and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server 124 or MCD 130) can then store the information in a database (e.g., datastore 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the security tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the security tag 200 and that cause the security tag 200 to perform any one or more of the methodologies of the present disclosure.

The input/output devices can include, but are not limited to, a display (e.g., an LCD display and/or an active matrix display), a speaker, a keypad, and/or light emitting diodes. The display is used to present item level information 226 in a textual format and/or graphical format. Similarly, the speaker may be used to output item level information 226 in an auditory format. The speaker and/or light emitting diodes may be used to output alerts for drawing a person's attention to the security tag 200 (e.g., when motion thereof has been detected) and/or for notifying the person of a particular pricing status (e.g., on sale status) of the item in which the tag is inserted.

The clock/timer 214 is configured to determine a date, a time, and/or an expiration of a predefined period of time. Techniques for determining these listed items are well known in the art, and therefore will not be described herein. Any known or to be known technique for determining these listed items can be used herein without limitation.

The security tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The technology disclosed herein is not limited to the particulars of this example. Any known or to be known technique for determining a geographic location can be used herein without limitation including relative positioning within a facility or structure.

The security tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As described herein, in some aspects, the EAS component 244 disposed in the security tag 200 may be any type of article surveillance mechanism, or combinations thereof. For example, in an aspect, the EAS component 244 may be an EAS sensor and/or an RFID sensor. In some further aspects, the EAS component 244 may include more than one sensor of the same type or of different types. For example, in one non-limiting aspect, the security tag 200 may have dual technology functionality (both RFID and EAS).

In an aspect, the EAS sensor may be a sensor of the type used in Acousto Magnetic (AM) systems. In one non-limiting aspect, for example, the detectors in an AM system emit periodic bursts at 58 KHz, which causes a detectable resonant response in an AM tag. A security tag in a 58 KHz system may also be implemented as an electric circuit resonant at 58 kHz. In an aspect, the EAS sensor to be incorporated into the security tag 200 may have a small and substantially flat form factor, and may have a degree of flexibility.

As shown in FIG. 2, the security tag 200 further comprises an energy harvesting circuit 232 and a power management circuit 234 for ensuring continuous operation of the security tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the security tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists therebetween. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the technology disclosed herein allows the security tag 200 to selectively enable the communication device 206 (e.g., transceiver) or at least one communications operation only when the tag's location within a facility is actually being changed (e.g., and not when a fan is causing the tag to simply vibrate).

In some scenarios, the security tag 200 can be also configured to enter a sleep state in which at least the motion sensor triggering of communication operations is disabled. This is desirable, for example, in scenarios when the security tag 200 is being shipped or transported from a distributor to a customer. In those or other scenarios, the security tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the security tag 200. In the event all of the storage and harvesting resources deplete to a point where the security tag 200 is about to enter a shutdown/brownout state, the power management circuit 234 can cause an alert to be sent from the security tag 200 to a remote device (e.g., tag reader 120 or server 124 of FIG. 1). In response to the alert, the remote device can inform an associate (e.g., a store employee 132 of FIG. 1) so that(s) he can investigate why the security tag 200 is not recharging and/or holding charge.

The power management circuit 234 is also capable of redirecting an energy source to the security tag's 200 electronics based on the energy source's status. For example, if harvested energy is sufficient to run the security tag's 200 function, the power management circuit 234 confirms that all of the security tag's 200 storage sources are fully charged such that the security tag's 200 electronic components can be run directly from the harvested energy. This ensures that the security tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the security tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that he/she can investigate the issue. It may be that other merchandise are obscuring the harvesting source or the item is being stolen.

The technology disclosed herein is not limited to that shown in FIG. 2. The security tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off the Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the security tag 200. Additionally, or alternatively, a switch can be actuated for creating a closed or open circuit. The technology disclosed herein is not limited in this regard.

In some examples, security tag 200 includes an RFID subsystem, such as communication-enabled device 204 described above, operative to receive an RFID interrogation signal and respond with an RFID response. Such security tags 200 include a non-RFID RF subsystem, also incorporated into communication enabled device 204, operative to receive a non-RFID RF signal and respond by wirelessly indicating that the non-RFID subsystem received the non-RFID RF signal. In some such examples, the non-RFID subsystem responds that the non-RFID RF subsystem received the non-RFID RF signal by one of: allowing the RFID subsystem to respond to the RFID interrogation signal with an RFID response only upon the non-RFID RF subsystem having received a non-RFID RF signal concurrently; supplementing the RFID response with at least one information element indicating that the non-RFID RF subsystem received the non-RFID RF signal; and separately transmitting a non-RFID response. In some such examples, the non-RFID RF subsystem is a personal area network (PAN) signal. In some such examples, the PAN is a Bluetooth PAN.

Figure 3:
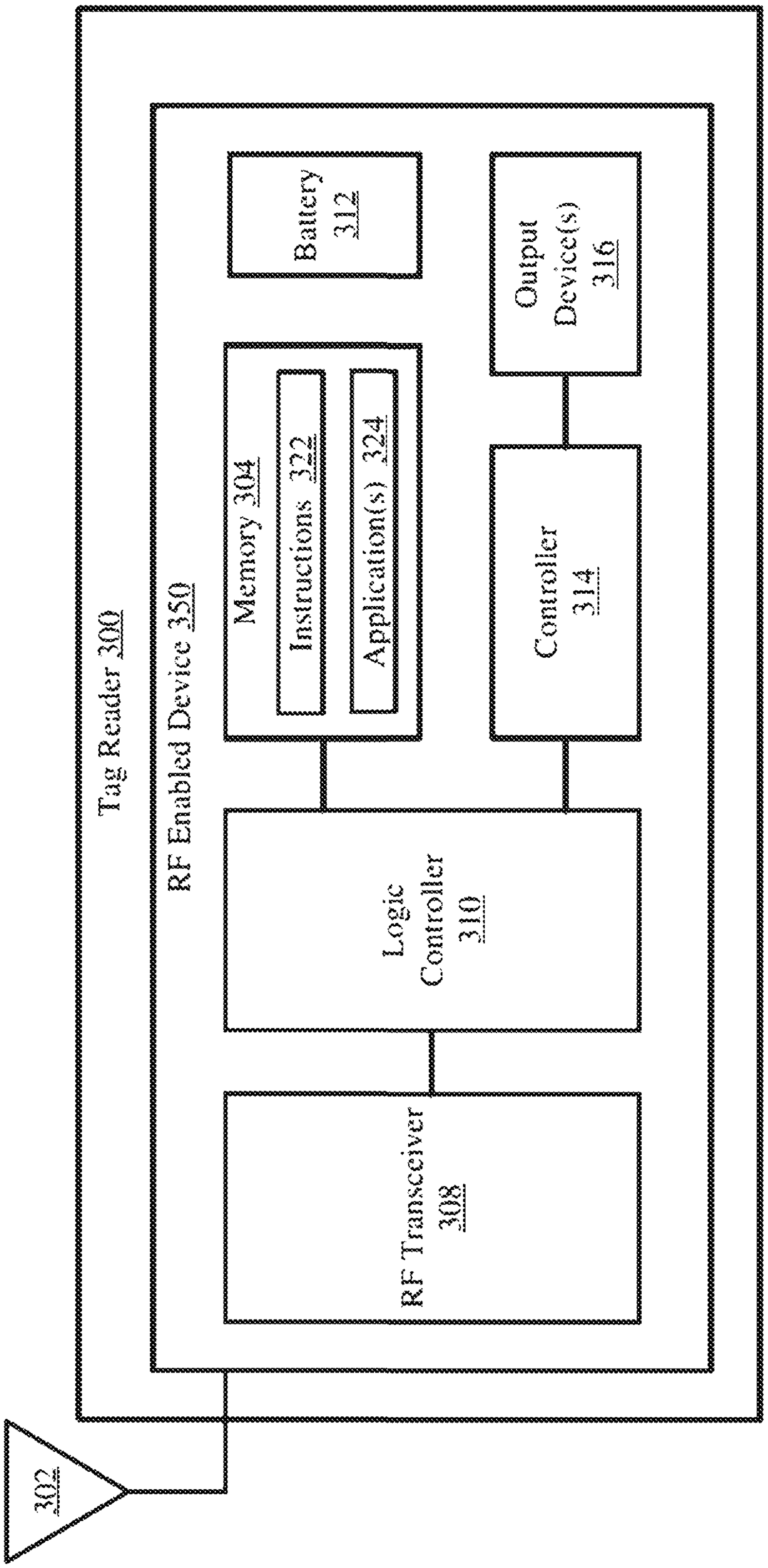
FIG. 3 is an illustration of an architecture for a tag reader, according to examples of the technology disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags 112$_1$-112$_N$, 118$_1$-118$_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags 112$_1$-112$_N$, 118$_1$-118$_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. In an aspect, the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is (are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in zone of a second RF signal (e.g., a Bluetooth beacon or NFC or other SRC system).

Figure 4:
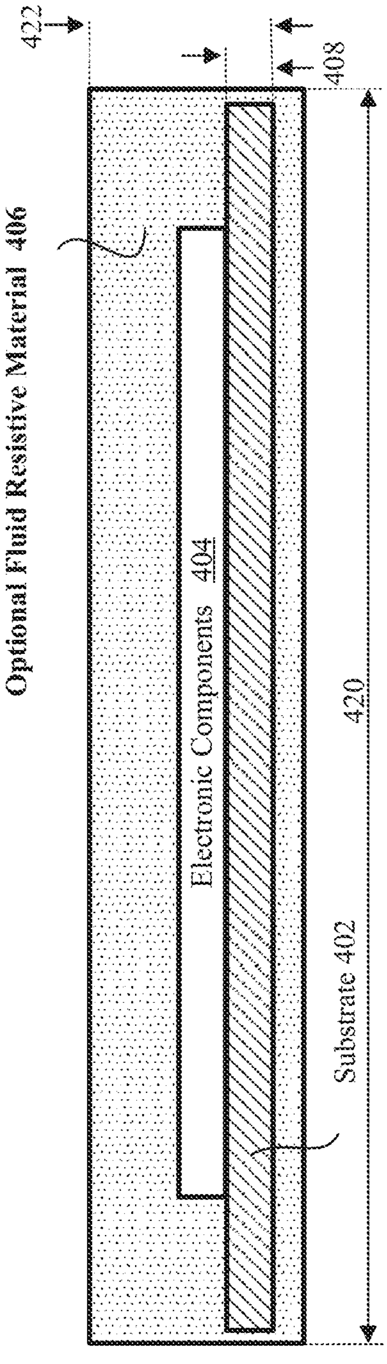
FIG. 4 is a side view of an architecture for a tag, according to examples of the technology disclosed herein.
Figure 5:
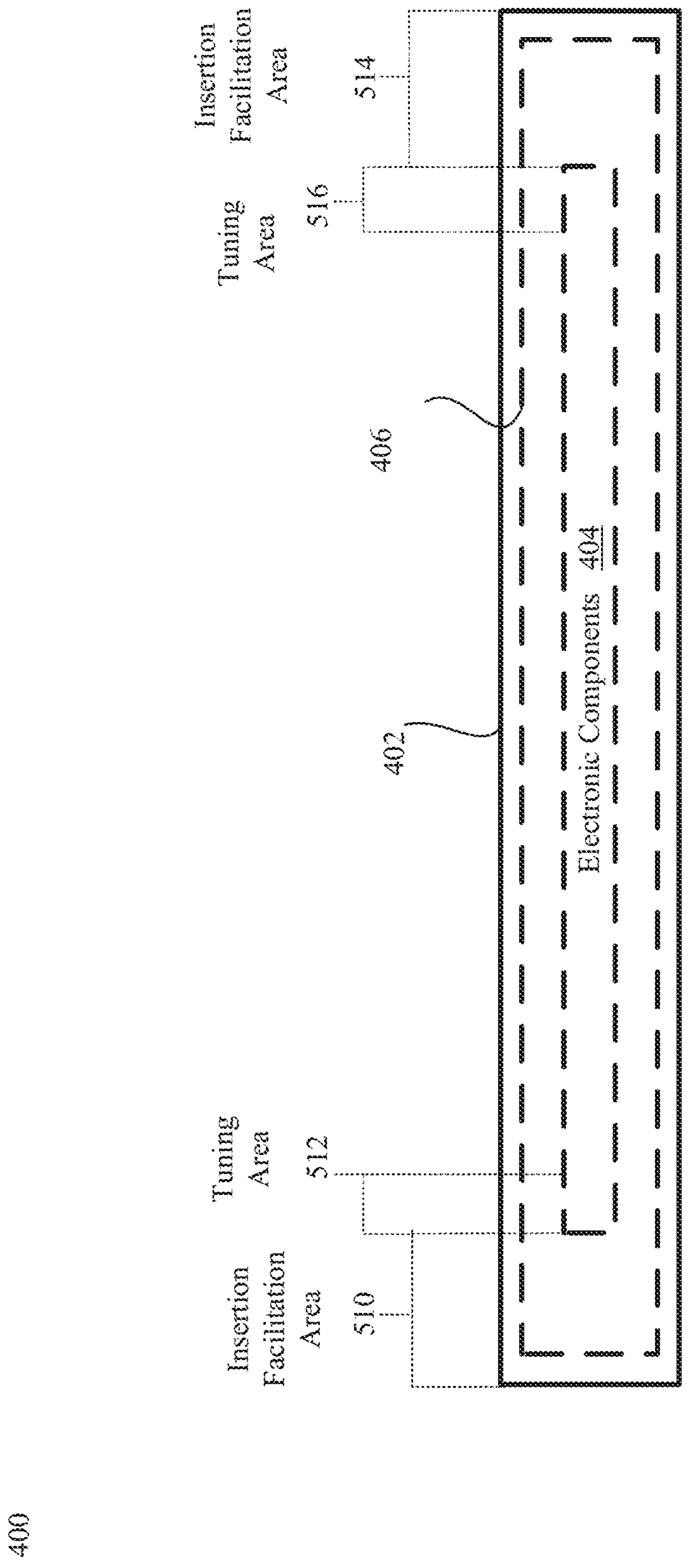
FIG. 5 is a top view of the architecture of FIG. 4, according to examples of the technology disclosed herein.

Referring now to FIGS. 4 and 5, an illustrative architecture for a security tag 400 includes a configuration that enables insertion of the security tag 400 between layers of an article. Security tag 400 may be the same as or similar to tag $112_1$-$112_N$, $118_1$-$118_X$ of FIG. 1 or security tag 200 of FIG. 2. As such, the discussion provided above in relation to tags 112, 118, 200 is sufficient for understanding the operations of security tag 400. Notably, the security tag 400 is designed to be relatively thin so that it is hard to feel when inserted into an item (e.g., item $110_1$-$110_N$, $116_1$-$116_X$ of FIG. 1), but thick enough to withstand a certain number (e.g., 2-5) of wash cycles. The item can include, but is not limited to, an article of clothing.

As shown in FIG. 4, security tag 400 comprises a substrate 402 on which electronic components 404 are mounted, attached, or disposed. The electronic components 404 can be the same as or similar to electronic components of FIG. 2. Accordingly, the electronic components 404 can include antenna(s), a communication enabled device, and/or an EAS component.

In an example, the substrate 402 is a relatively thin, narrow, lightweight, recyclable and/or machine-washable substrate. In one aspect, the substrate 402 may be an elongated substrate 402. The substrate 402 can include, but is not limited to, any type of flexible material as described above, such as but not limited to a fabric, a silk, a cloth, a plastic, and/or a paper. In some aspects, the substrate 402 may comprise a polyester (e.g., PET) substrate. A thickness 408 of the substrate 402 is selected so that the substrate 402 has a physical strength that allows a threshold amount of tension to be maintained on the security tag 400 while inserting the tag into the item. For example, but not limited hereto, thickness 408 can have a value between 0.0004 inches and 0.008 inches. Further, for example but not limited hereto, a width of the substrate 402 can be between 0.1 inches and 0.2 inches, which is small enough so that the tag is not felt by humans when inserted into an item. The technology disclosed herein is not limited to the particulars of this example.

In the present aspects, the security tag 400 may be flexible, bendable, stretchable, or otherwise configured and/or constructed to sustain deformations. Also, the flexibility of the security tag 400 allows for the security tag 400 to be constructed and arranged so that the aforementioned deformations do not negatively affect the functionality and operation of the electronic components 404 disposed within the security tag 400. In some aspects, the security tag 400 may be manufactured to satisfy standards of environmental sustainability. For example, in some aspects, a natural-fiber fabric may be used as the substrate layer 402 (or as a portion of the substrate layer 402) so that the security tag 400 incorporates less plastic material than conventional security tags. For example, the security tag 400 may be manufactured using natural-fiber fabric substrates that are sustainable in nature, particularly if the fabric is non-polyester. In some alternative aspects, the flexible fabric substrate may be made of a textile manufactured from recycled plastics, thus allowing the security tag 400 to be manufactured to satisfy sustainability requirements.

In some scenarios, the substrate 402 and electronic components 404 are coated with a layer of a flexible, fluid resistive material 406 for protecting the same from damage due to fluid exposure. The fluid resistive material 406 can be a plastic material. The plastic material may include, but is not limited to, a Thermoplastic Polyurethane (TPU) material, a Polyethylene terephthalate (PET) material, copolyamide, and/or copolyester. Generally, the fluid resistive material 406 may be any waterproof material to protect the electronic components (e.g., by sealing the electronic components hermetically), which can be laminated in industrial processes (such as heat lamination, adhesive lamination or extrusion lamination) and that is safe and acceptable in textile industry (for example Oeko-tex 100 certified materials). In addition, the selected fluid resistive material 406 should be able to withstand exposure to washing, bleaching, and softening chemicals.

The fluid resistive material 406 can be applied to either or both sides of the substrate. The fluid resistive material 406 may be colored to match the color of the item (e.g., item $110_1$-$110_N$, $116_1$-$116_X$ of FIG. 1) in which the security tag 400 is inserted. The fluid resistive material 406 can be altered in appearance via a heat source. The appearance may be altered by changing from one color and/or pattern to another one of a variety of colors and/or patterns. For example, but not limited hereto, the fluid resistive material 406 can be altered from a clear color to a purple and yellow polka dot.

Still referring to FIG. 4, in yet another alternative aspect, the substrate layer 402 may be made of fabric, or any other type of flexible, sewable material, and the substrate layer 402 may have a thin film of a plastic material, such as but not limited to a thermoplastic polyurethane (TPU) 406, applied to at least one side such that the TPU film 406 provides a substrate for the application of the EAS and/or RFID sensor. After the electronic components 404 are applied to the TPU film 406, another layer of TPU may be applied to provide the coating layer 406 and thereby encapsulate the sensor between two TPU layers.

As shown in FIG. 5, the security tag 400 has insertion facilitation areas 510, 514 on at least one end, but in some cases both ends. Each insertion facilitation area 510, 514 is formed on an end portion of the security tag 400 and configured to enable insertion of the security tag 400 in between layers of an item. In some implementations, the insertion facilitation area 510 and/or 514 of the security tag 400 facilitates, for example, attachment of a tool to pull the security tag 400 through the opening between two layers and/or between two seams in the article (e.g., a garment) without interference with and/or causing damage to the antenna(s) and/or other electronic components. In other implementations, the insertion facilitation area 510 and/or 514 of the security tag 400 facilitates, for example, pushing the security tag 400 through the opening between two layers and/or between two seams in the article (e.g., a garment) without interference with and/or causing damage to the antenna(s) and/or other electronic components. In some scenarios, insertion facilitation areas 510, 514 may have different stiffness/flexibility from the remaining portion of the tag. The different stiffness/flexibility of the insertion facilitation areas 510, 514 of the security tag 400 may be selected based on whether the security tag 400 is configured to be pushed through or pulled through the opening in the article. In an aspect, greater flexibility of the insertion facilitation areas 510, 514 of the security tag 400 may be achieved, for example, by making the insertion facilitation areas 510, 514 thinner than the remaining portion of the security tag 400. In an aspect, the insertion facilitation areas 510, 514 could have plastic material coating 406 on one side only, while the remaining portion of the security tag 400 has plastic material coating on both sides. In an alternative aspect, the insertion facilitation areas 510, 514 could have no plastic material coating 406, while the remaining portion of the security tag 400 has plastic material coating on one side. In yet another alternative aspect, the insertion facilitation areas 510, 514 could have thinner plastic material coating 406 than the remaining portion of the security tag 400. In an aspect, to facilitate insertion of the security tag 400, the plastic material coating 406 may have flexular modulus (bending modulus of elasticity) of at least 2 GPa, width of at least 2 mm and thickness of at least 50 μm.

In some scenarios, the antenna(s) of the electronic components 404 are formed as conductive trace(s) via ink printing and/or deposition (e.g., sputter deposition). The conductive trace/ink/layer, as used throughout may be, but are not limited to, silver, copper, gold, aluminum, nickel, or various forms of carbon, either suspended as particles or dissolved in a solution.

The antenna(s) can be linear or loop. In some scenarios, but not limited hereto, length 420 of the security tag 400 can be in the range of 60-150 mm when the antenna(s) is (are) loop antenna(s). A thickness of the antenna(s) should be as thin as possible provided that the security tag 400 has enough physical strength to withstand a given pulling/pushing force and/or a given number of wash cycles.

The antenna(s) may be designed so that the tag's operating frequency is in a range of 840-960 MHz (inclusive of 840 and 960), a range of 860-940 MHz (inclusive of 860 and 940), a range of 865-868 MHz (inclusive of 865 and 868), or a range of 902-928 MHz (inclusive of 902 and 928). The antenna(s) may additionally or alternatively comprise tuning area(s) 512, 516. Each tuning area 512, 516 comprises a portion of an antenna that can be modified for selectively and/or dynamically tuning an operating frequency of the tag.

In some scenarios, the antenna(s) are formed by coupling physical wire(s) or conductive fibers to the substrate 402. In some aspect, but not limited hereto, each wire may have a diameter between 0.1 mm and 1 mm, and a length between 100 mm and 160 mm.

Figure 6:
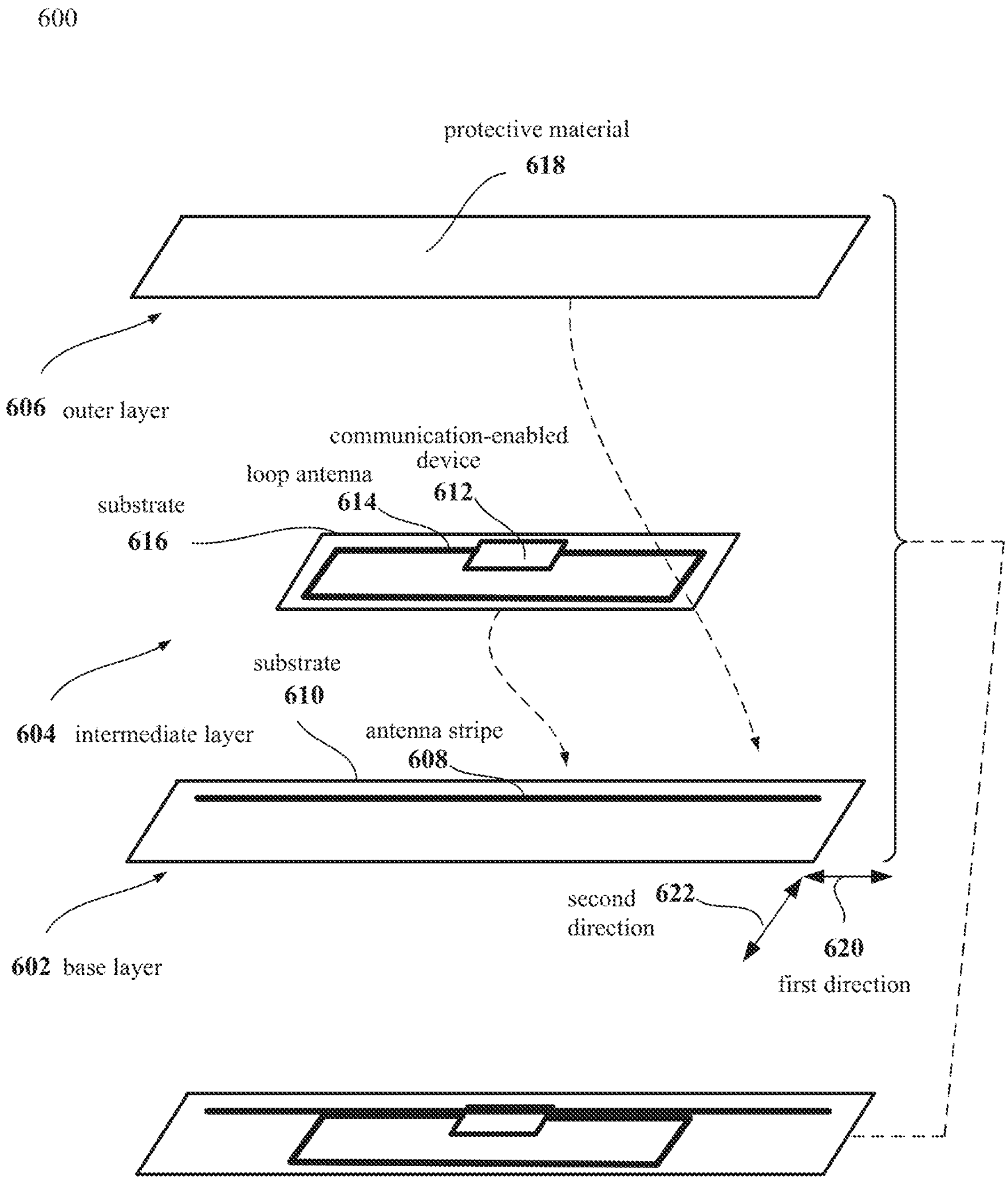
FIG. 6 is an illustration of a multi-layered security tag, according to examples of the technology disclosed herein.
Figure 7:
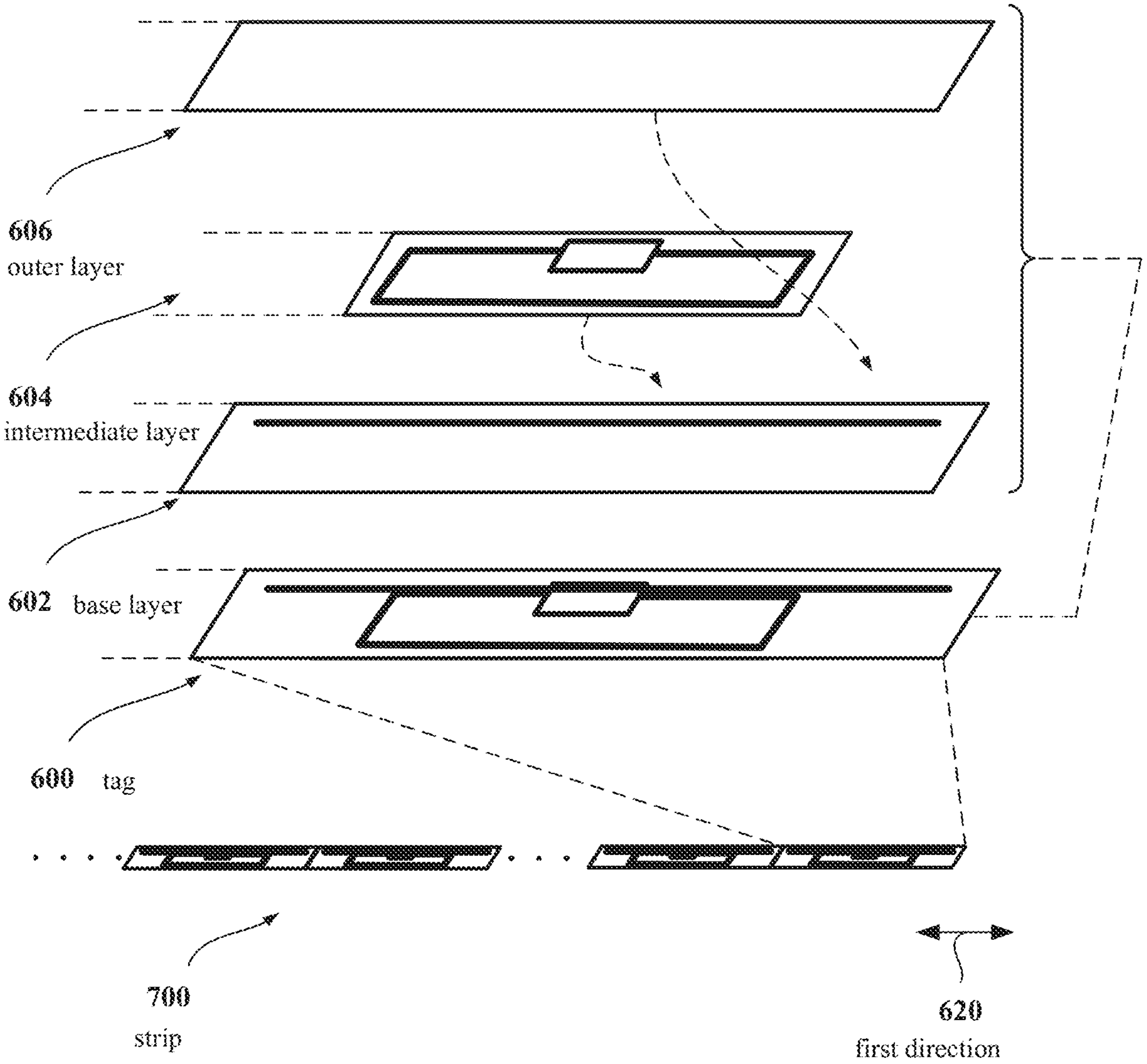
FIG. 7 is a schematic perspective view of a method of manufacturing respective strips of a plurality of security tags from a plurality of elongated material and/or component layers, which are shown above the respective strips in magnified views, according to examples of the technology disclosed herein.
Figure 8:
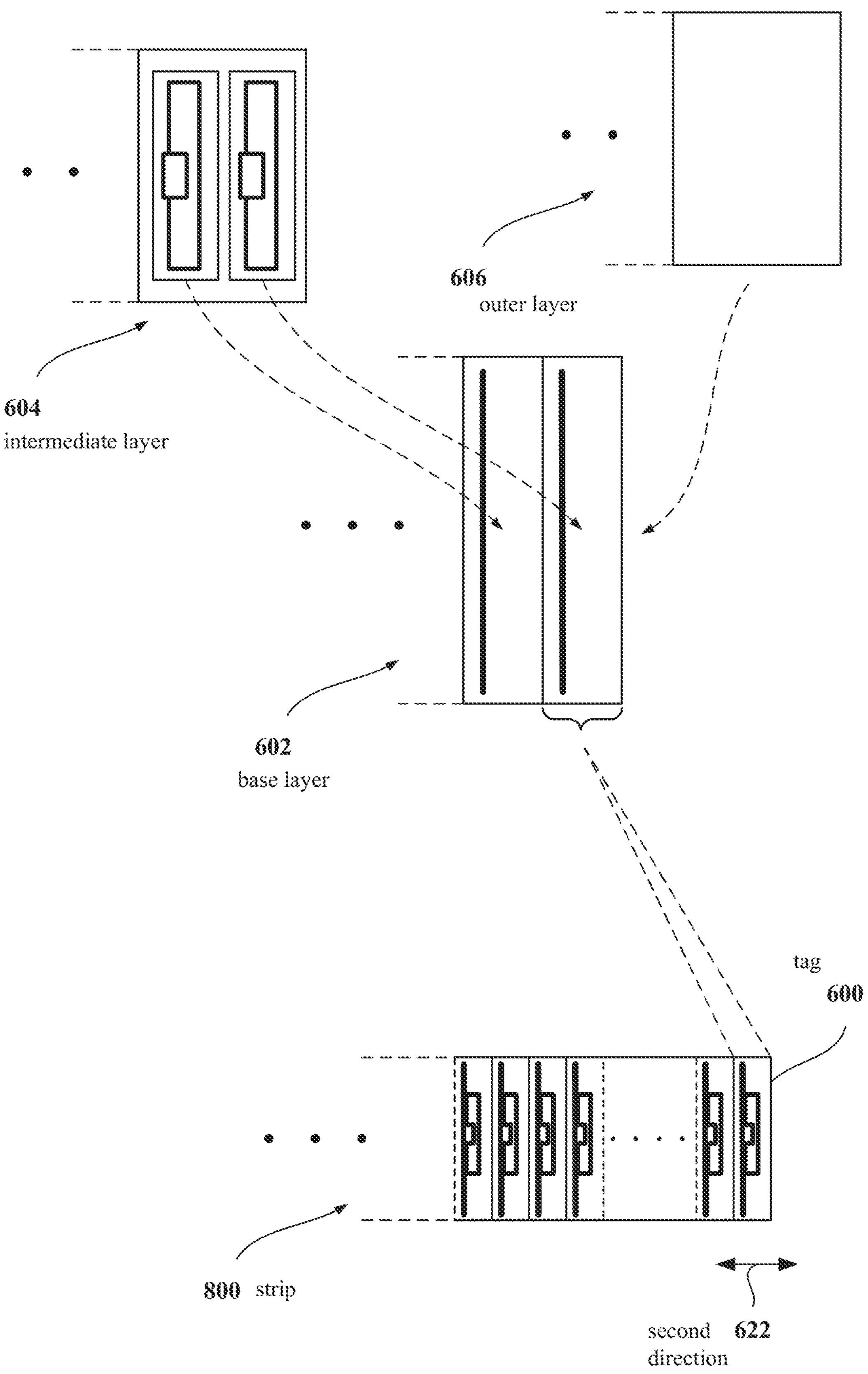
FIG. 8 is a schematic top view of a respective strips of a plurality of security tags from a plurality of elongated material and/or component layers, according to examples of the technology disclosed herein.

Referring to FIGS. 6-8, one example of a multi-layered security tag 600, similar to the security tag 400 described in FIGS. 4 and 5, may be produced by combining different material and/or component layers, such as a base layer 602, an intermediate layer 604, and an outer layer 606. In one implementation, the base layer 602 includes an antenna stripe 608 attached to a substrate 610, the intermediate layer 604 includes a communication-enabled device 612 electrically connected to a loop antenna 614, both attached to a substrate 616 and electrically connectable with the antenna stripe 608, such as via inductive coupling, and the outer layer 606 includes a protective material 618 that covers the communication-enabled device 612, the loop antenna 614, and the antenna stripe 608. Although the outer layer 606 in this example is illustrated as a top layer, it should be understood that the outer layer may alternatively or additionally include a bottom layer.

Each of the layers 602, 604, and 606 may be an elongated film, for example stored on a roll, and extending in either a first direction 620 or a second direction 622, e.g., respectively parallel or perpendicular relative to a length of the antenna stripe 608 and/or the loop antenna 614.

In one implementation, for example, the substrate 610 of the base layer 602 includes a plastic material, such as a TPU, and the antenna stripe 608 is a metallic electrically conductive material adhered to or printed onto the TPU material. Further, regarding the intermediate layer 604, the communication-enabled device 612 may include an integrated circuit having an RFID chip, the loop antenna 614 is a metallic electrically conductive material adhered to or printed onto the substrate 616, and the substrate 616 may be a plastic material, such as a polyethylene terephthalate (PET). In some alternative or additional implementations, hotmelt adhesive may be used to mount the communication-enabled device 612 to the substrate 616. The outer layer 606 may be a plastic material, such as a TPU.

In one implementation, the intermediate layer 604 is in the form of a wet inlay that is applied onto the base layer 602, with the communication-enabled device 612 and the loop antenna 614 being electrically connected to, or inductively coupled with, the antenna stripe 608, and then the outer layer 606 is laminated, e.g., using heat, onto the base layer 602. It should be understood, however, that the various layers may be manufactured and/or assembled in a different manner and/or in a different order and/or by different entities (e.g., antenna manufacturer, tag manufacturer, tag converter entities). Thus, the methods and structures herein provide a flexible, fabric-like narrow security tag 600 that can be easily and efficiently positioned (pulled or pushed) into a space between seams that connect to adjacent layers of material of an article of clothing.

Referring specifically to FIG. 7, a strip 700 of security tags 600 is formed as described above with the layers 602, 604, and 606 extending in direction 620.

Referring specifically to FIG. 8, a strip 800 of security tags 600 is formed as described above with the layers 602, 604, and 606 extending in direction 620.

Figure 9:
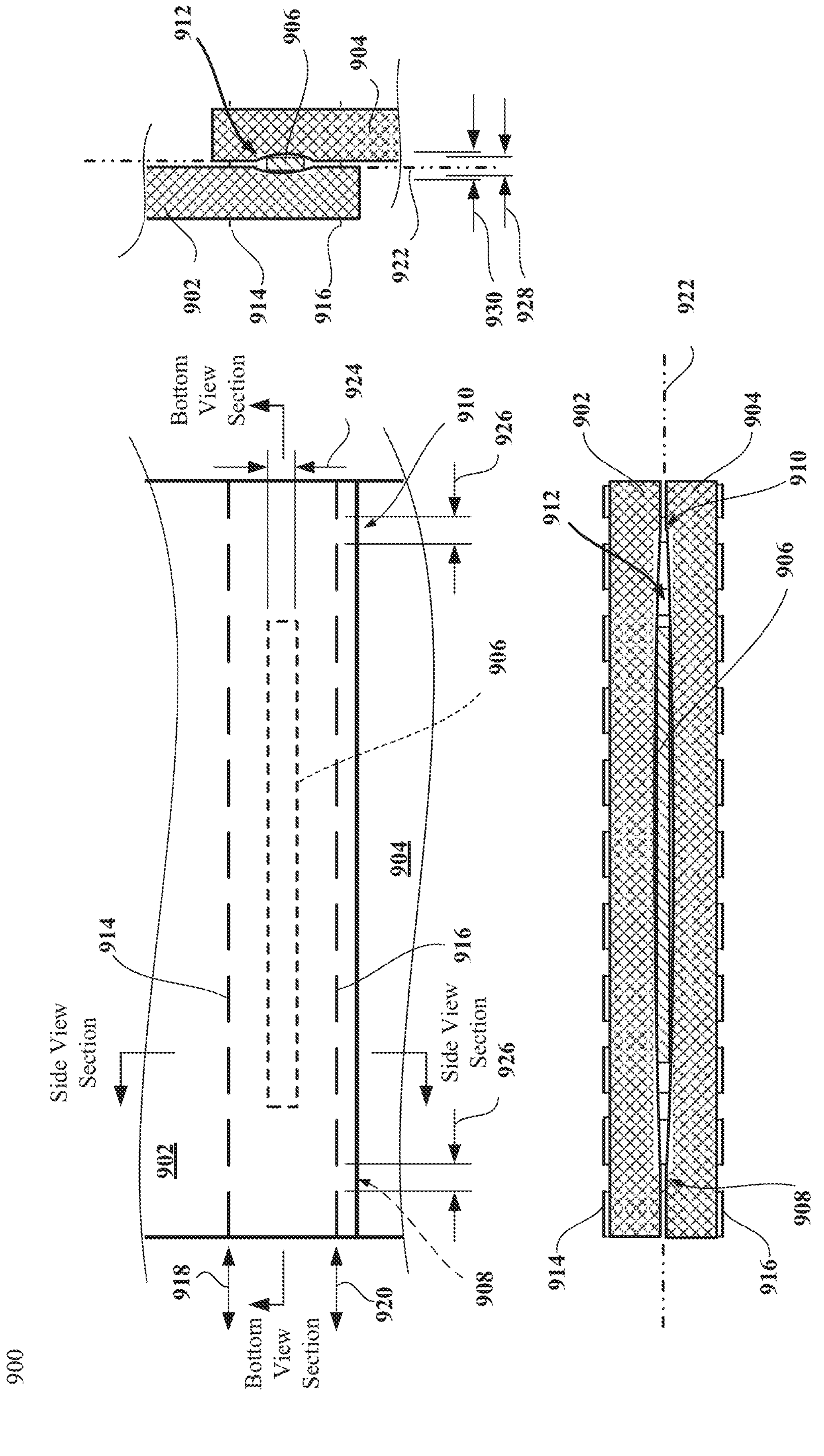
FIG. 9 illustrates a front view, a bottom view and a side view of a portion of an example article including a security tag positioned through an opening into an interface space between the two layers of material of the article, according to examples of the technology disclosed herein.

Referring to FIG. 9, in one example, an article of clothing 900 having two fixedly connected overlapping layers of material 902 and 904 includes a security tag 906 positioned through at least one opening, such as opening 908 and/or 910, into an interface space 912 between the two layers 902 and 904. The security tag 906 may be the same as or similar to 112, 118, 200, 400, 600. The two overlapping layers of material 902 and 904 may be fixedly connected by one or more opposing connectors 914 and 916 that are spaced apart in a manner to form the interface space 912 sized to receive the security tag 906. For example, in one implementation, the one or more connectors 914 may extend along line 918 and the opposing one or more connector 916 may extend along line 920 to form the interface space 912 extending along a portion of the article of clothing 900. For example, the interface space 912 may be defined as a space extending along an interface plane 922 formed by opposing surfaces of the overlapping layers of material 902 and 904, and further bounded by the one or more opposing connectors 914 and 916. Further, as the layers of material 902 and 904 may be formed of a material that is flexible and/or elastic, the interface space 912 may expand and/or deform to accommodate receiving the security tag 906 upon insertion of the security tag 906, and/or to accommodate receiving a tool used to insert the security tag 906, into the interface space 912. Suitable examples of the layers of material 902 and 904 may include, but are not limited to, any natural and/or artificial fabric or material used to make clothing or other articles, such as but not limited to cotton, polyester, stretch fabric (e.g., neoprene, elastomeric, spandex, elastane), leather, silk, hemp, etc. Although lines 918 and 920 are illustrated as straight lines, it should be understood that they may be curved lines, or a combination of straight lines, curved lines, and/or straight and curved lines. The one or more opposing connectors 914 and 916 may be any type of device and/or mechanism able to fixedly attach layer of material 902 to layer of material 904. Suitable examples of the connectors 914 and 916 may include, but are not limited to, thread, adhesive, rivets, anchors, fasteners, welds (e.g., via sonic welding), and/or any other layer-connecting mechanism. In some cases, the connectors 914 and 916 may be a double-stitched seam, where each connector 914 and 916 is a separate seam. For instance, in this case, each seam may be formed from a stitch of thread, such as but not limited to a chain stitch.

In this example, the security tag 906, and/or a tool used to insert the security tag 906 into the interface space 912, is sized to fit within opening 908 and/or 910. For example, a width 924 of the security tag 906 (and/or a tool used to position the security tag 906) may be equal to or less than a width 926 of the opening 908 and/or 910, and a height 928 of the security tag 906 (and/or a tool used to position the security tag 906) may be equal to or less than a height 930 to which the interface space 912 may deform and/or expand. In one example, the opening 908 and/or 910 may be formed near an end of at least one of the overlapping layers of material 902 and 904 by a spacing between adjacent ones of the connectors 916, such as along line 920.

In some cases, referred to as push-through placement, the security tag 906 may be pushed into one of the openings 908 or 910 and positioned within the interface space 912. In other cases, referred to as pull-through placement, the security tag 906 may be pulled into one of the openings 908 or 910 and positioned within the interface space 912. For example, in one implementation of a pull-through placement, an elongated tool such as a bodkin or a needle may be inserted into a first opening, such as opening 908, extended through the interface space 912 and out of a second opening, such as opening 910, and connected to an end of the security tag 906. Then, the elongated tool with the security tag 906 attached may then be pulled back through the interface space 912 in order to position the security tag 906 within the interface space 912. In some cases, the elongated tool, and an end of the security tag 906 attached to the elongated tool may be pulled out of the first opening, and then the security tag 906 is disconnected from the elongated tool and pushed back into the first opening in order to finally position the security tag 906 in the interface space 912. In some cases where both openings are present, the openings 908 and 910 may be spaced apart a distance greater than a length of the security tag 906, for example, to enable the elongated tool and the security tag 906 to be maneuvered into the interface space 912. In other implementations, the openings 908 and 910 may be spaced apart a distance less than a length of the security tag 906, for example, when the two fixedly connected overlapping layers of material 902 and 904 are sufficiently flexible and/or elastic and/or deformable, and/or when the security tag 906 is sufficiently flexible, to enable the elongated tool and the security tag 906 to be maneuvered into the interface space 912.

Figure 10:
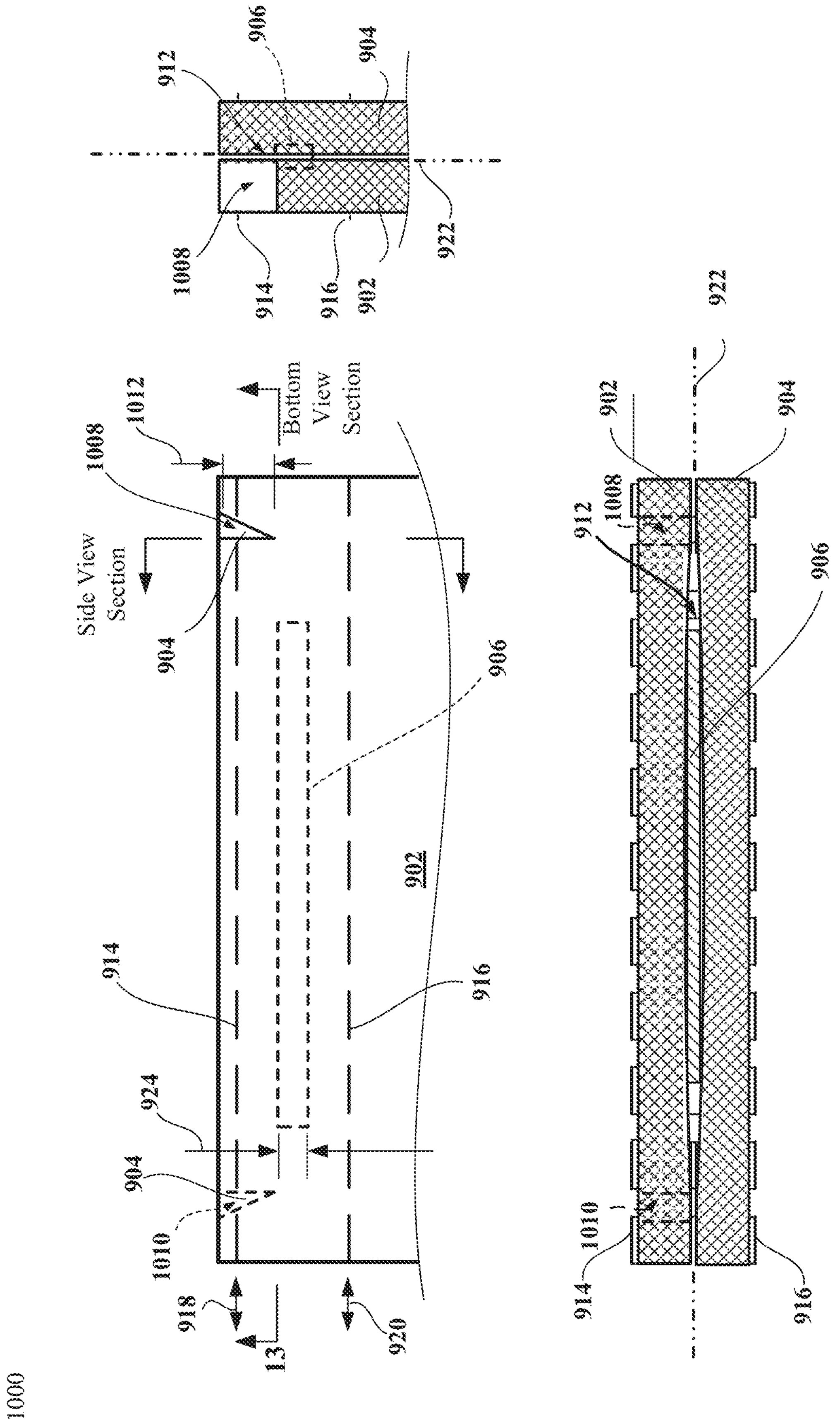
FIG. 10 illustrates a front view, a bottom view and a side view of a portion of an example article including a security tag positioned through the notch into an interface space between the two layers of material of the article, according to examples of the technology disclosed herein.

Referring to FIG. 10, in another example, an article of clothing 1000 is similar to the article of clothing 900 (FIGS. 9-11) in that is has two fixedly connected overlapping layers of material 902 and 904 and includes the security tag 906 positioned through at least one opening into the interface space 912, but in this case the at least one opening 1008 is in the form of a notch in one of the layers of material, such as in layer 902. The opening 1008, also referred to as notch 1008, in one layer of material, such a layer of material 902, exposes an inner surface of the opposing layer of material 904, thereby enabling the security tag 906 to be positioned within the interface space 912. The notch 1008 may have any size and/or shape sufficient to accommodate insertion of the security tag 906. For instance, the notch 1008 includes an opening dimension 1012, such as a width or length, equal to or greater than a width 924 of the security tag 906. Although illustrated herein as having an angular shape, it should be understood that the notch 1008 may have any shape configured to allow insertion of the security tag 906 into the interface space 912. In some cases, such as in a push-through placement of the security tag 906, the article of clothing 1000 may only have a single opening or notch 1008. In an alternative or additional case, such as in a pull-through placement of the security tag 906, the article of clothing 1000 may have a second opening or notch 1010 spaced apart from the first opening or notch 1008. As noted above with respect to the openings 908 and 910 of FIG. 9, the notches 1008 and 1010 may be spaced apart a distance greater than or less than the length of the security tag 906. In an implementation where the spacing of the notches 1008 and 1010 is less than the length of the security tag 906, such spacing may reduce the likelihood of the security tag 906 being able to work its way out of one of the notches 1008 and 1010 once positioned within the interface space 912. The connectors 914 and 916 may be the same as those described above, but the use of the notch 1008 and/or 1010 may be particularly suited for use with the connectors 914 and 916 including an overlock sewn stitch, where otherwise it may be difficult to find an area that provides an opening to the interface space 912 sufficiently sized to receive the security tag 906.

Consequently, in some cases, the configuration of the article of clothing 1000 including one or both notches 1008 and 1010 improves the case of inserting the security tag 906 and reduces the time required to insert the security tag 906 in between the two layers of layers of material 902 and 904, such as when connected with overlock sewn stitches. The notch 1008 and/or 1010 or cut can be designed into the clothing pattern and added to the manufacturing process either at a cutting table prior to fabric assembly, during the cut and sew production, or added after the article of clothing 1000 is sewn.

Figure 11:
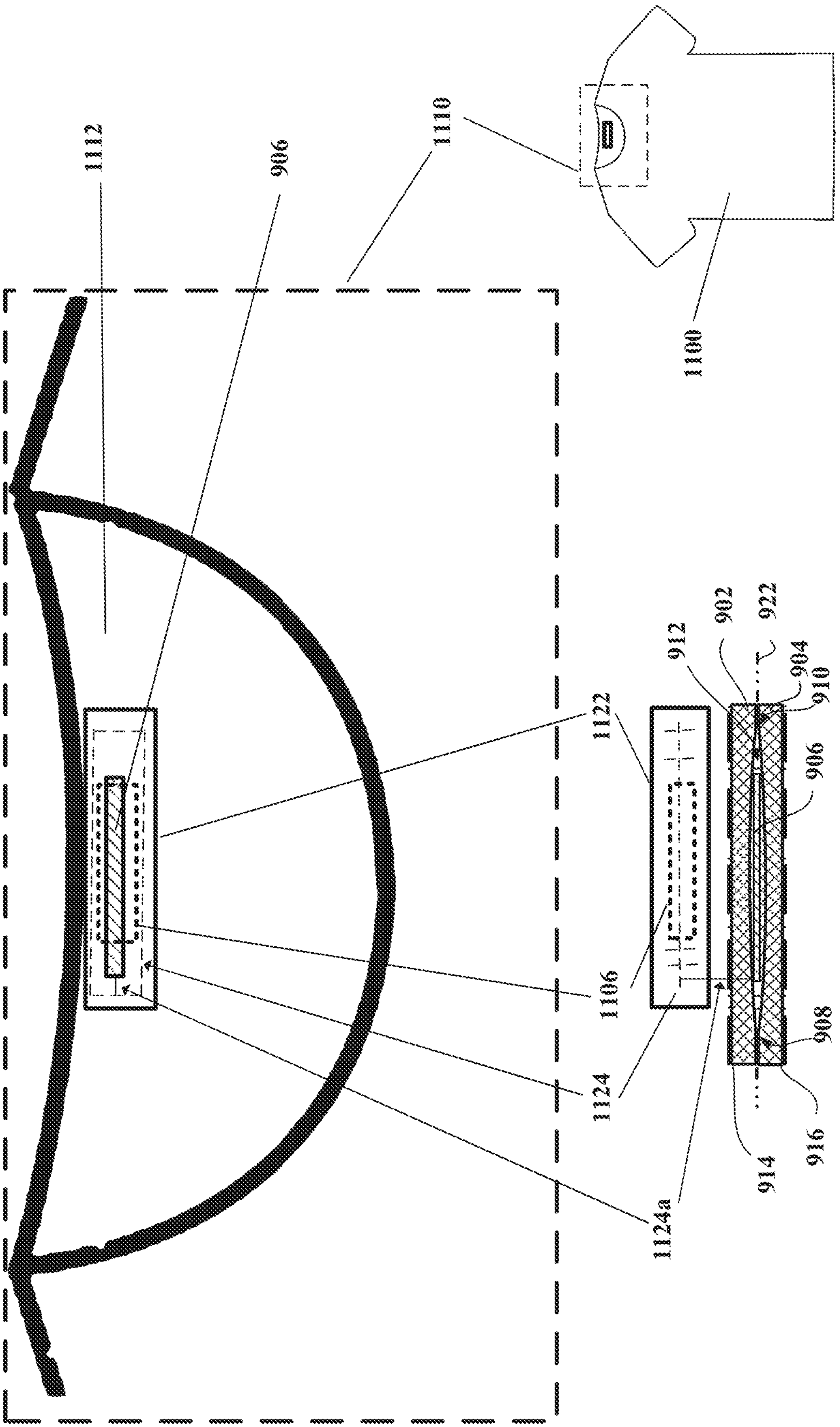
FIG. 11 illustrates a secured article, in accordance with examples of the technology disclosed herein.

Referring to FIG. 11, and continuing to refer to prior figures for context, a secured article 1100 is shown, in accordance with examples of the technology disclosed herein. Window 1110 presents a magnified view of a relevant portion of secured article 1100. In the example of FIG. 11, the secured article 1100 is a tee shirt. In other examples, the article can be any of objects 110 (or items, e.g., $\mathbf{110}_1$-$\mathbf{110}_N$), and objects 116 (e.g., $\mathbf{116}_1$-$\mathbf{116}_X$) to be secured using an RFID tag.

The secured article includes a tag set that includes a first tag and a second tag. In the example of FIG. 11, secured article 1100 includes a tag set that includes a first tag 1106 and a second tag 906. First tag 1106 and second tag 906 can each be one of RFID tag 112, tag 118, tag 200, tag 400, tag 600, or tag 1104. Each of the first tag and the second tag is attached to the secured article. In the example of FIG. 11, each of first tag 1106 and second tag 906 is attached to secured article 1100. First tag 1106 is attached to brand label 1122 using methods including those described elsewhere herein. Second tag 906 is embedded in the neckband 1112 of secured article 1100, e.g., as described in conjunction with FIG. 11-FIG. 13 and elsewhere herein. In some examples of the technology disclosed herein, the first tag and the second tag can be attached to the secured article in other manners, e.g., both tags can be embedded in the article, e.g., one tag can be attached to a hang tag while the hang mechanism includes a conductive thread disabling the second tag embedded in (or behind) a fastener (such as a button, a clasp, or a zipper)

A disablement structure is attached to the secured article in physical proximity to the first tag. In the example of FIG. 11 disablement structure 1124 is conductive thread 1124 stitching the brand label 1122, which carries the first tag 1106, to the secured article 1100. In some examples, the physical proximity can include the disablement structure and the first tag being one or more of overlapping and intersecting. More generally, physical proximity can include the disablement structure being i) substantially coextensive with the first tag and ii) inseparable from the first tag without disablement of the first tag and the disablement structure. In some examples, the disablement structure comprises a metal structure that electromagnetically couples at least one of inductively and capacitively to the second tag to impede the operation of the second tag via changing an impedance of the second tag The disablement structure is in electromagnetic relationship with the second tag. In the example of FIG. 11, a conductive connecting element 1124*a* (e.g., conductive thread) of the disablement structure 1124 is connected to second tag 906, thereby changing a property of second tag 906 (e.g., de-tuning an antenna such as antenna 202 or 216 of tag 200) such that second tag 906 is disabled.

This arrangement provides physical proximity between the first tag 1106 and the disablement structure 1124 such that most modes of removal of/damage to the first tag 1106 will also remove/damage/alter the disablement structure 1124 to such an extent that an electromagnetic relationship between the disablement structure and the second tag 906 will be altered to such an extent that the second tag 906 will no longer be disabled. In some examples, the physical proximity can include the disablement structure and the first tag being one or more of overlapping and intersecting.

In some examples of the technology disclosed herein, the first tag and the second tag can be attached to the secured article in other manners that that of the example of FIG. 11, e.g., both tags can be embedded in the article, e.g., one tag can be attached to a hang tag while the hang mechanism includes a conductive thread disabling the second tag embedded in (or behind) a fastener (such as a button, a clasp, or a zipper).

While the example of FIG. 11 fully disables second tag 906 until the disablement structure 1124 is disrupted, in other examples, the disablement structure only partially disables the second tag such that performance differences (e.g., response of the second tag to an RFID interrogation signal) are apparent at a reader such as tag reader 300.

Figure 12:
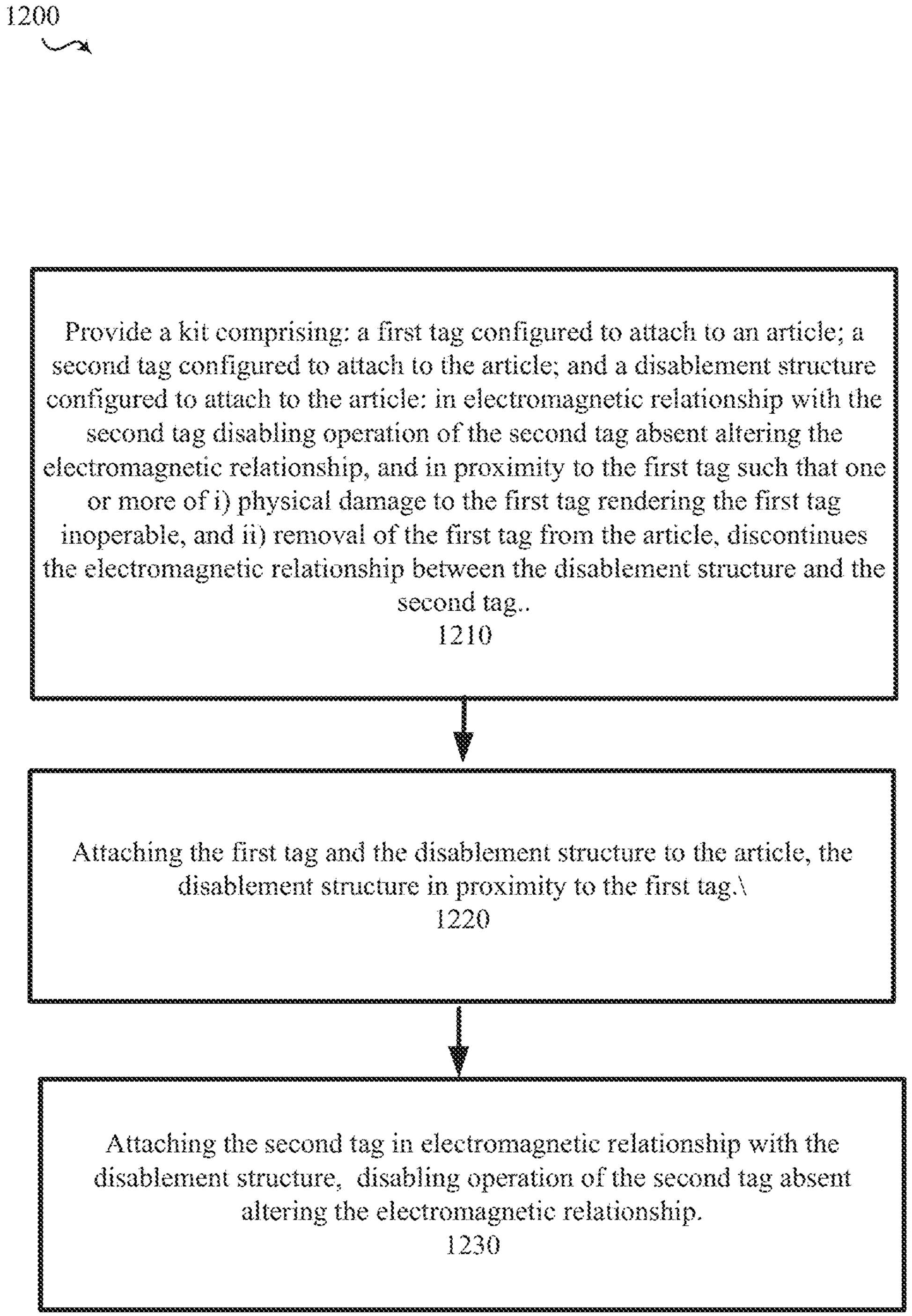
FIG. 12 is a flow chart illustrating methods of securing an article, in accordance with examples of the technology disclosed herein.
Figure 13:
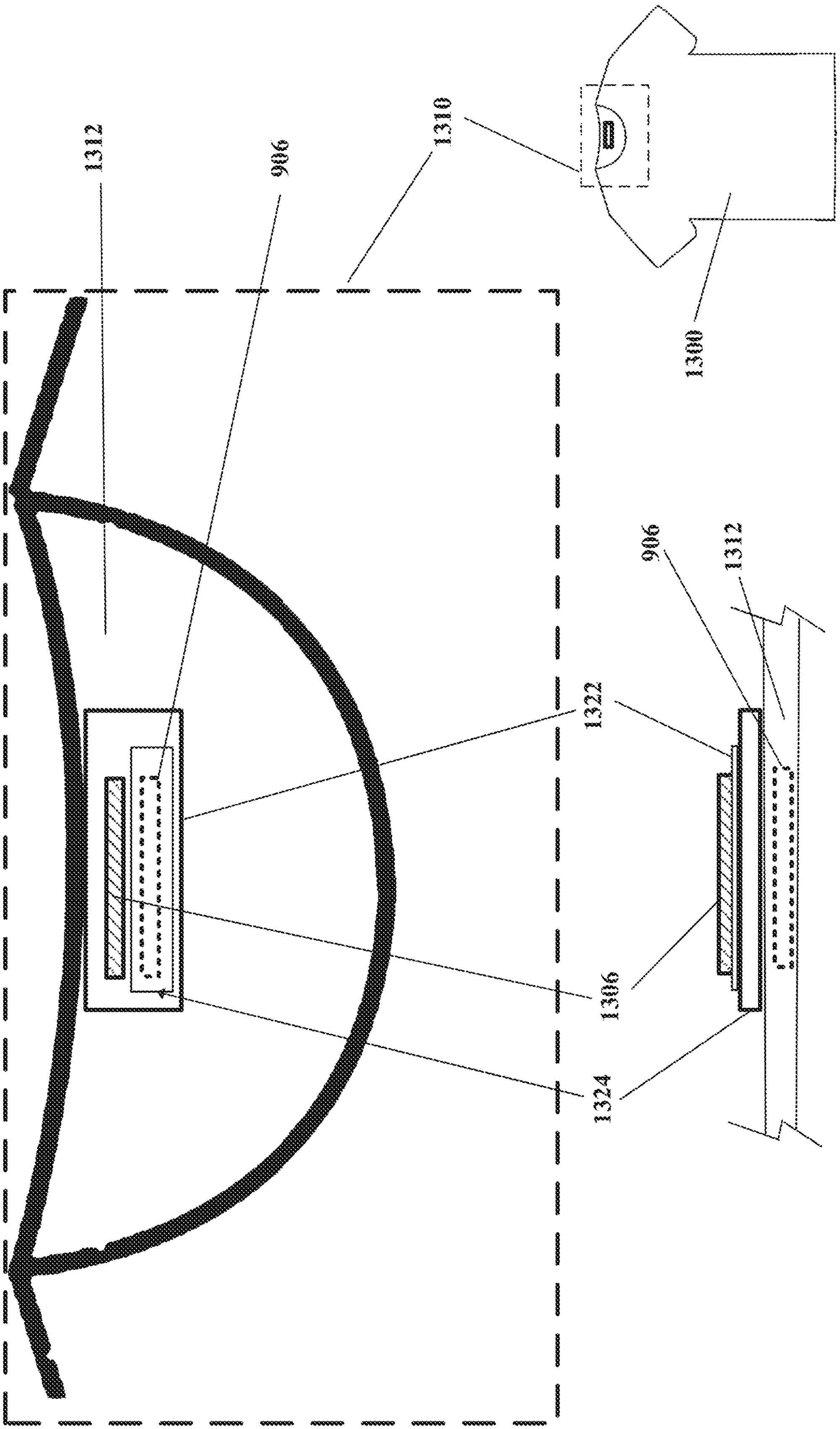
FIG. 13 illustrates a secured article, in accordance with examples of the technology disclosed herein.

Referring to FIG. 12, and continuing to refer to prior figures for context, methods 1200 of securing an article is shown, in accordance with examples of the technology disclosed herein. In such methods 1200, a kit is provided—Block 1210. The kit includes a first tag, a second tag, and a disablement structure. Referring to FIG. 13, and continuing to refer to prior figures for context, elements of an example kit are shown. The example kit includes first tag 1306, second tag 906, and disablement structure 1324. In the example of FIG. 13, disablement structure 1324 is a thin layer of high permittivity material.

The first tag and the disablement structure are attached to the article, with the disablement structure in proximity to the first tag—Block 1220. In the example of FIG. 13, both the first tag 1306 and the disablement structure 1324 are attached to brand label 1322, which label is sewn to the neckband 1112 area of article 1300—shown magnified in window 1310. "Proximity" in this example means adjacent and not overlapping. Most every effort to cut or remove the brand label that would damage the first tag 1306 would also damage the disablement structure 1324 in proximity to the first tag 1306.

The second tag is attached in electromagnetic relationship with the disablement structure, disabling operation of the second tag absent altering the electromagnetic relationship—Block 1230. In the example of FIG. 13, second tag 906 is embedded in neckband 1312 in a manner described elsewhere herein. Second tag 906 is embedded in electromagnetic relationship with disablement structure 1324 by being embedded directly under shielding disablement structure 1324—thereby shielding, at least in part, second tag 906 from RFID reader interrogation. In other examples, both first tag 1306 and second tag 906 are on brand label 1322, and disablement structure 1324 is on/embedded in neckband 1312.

In some examples, when the electromagnetic relationship is altered the second tag is enabled. In some examples, an operating characteristic (detectable by a tag reader) of the second tag is changed—e.g., the magnitude, duration, or frequency of a response from an interrogated second tag changes. In some examples, a combined operating characteristic (detectable by a tag reader) of the combined first tag and second tag is changed.

While examples used herein include at least one component of a kit on a brand label of an article, other arrangements apply to the technology disclosed herein, e.g., use of other tags such as a care tag, direct application to the body of the secured article. While an article of clothing is used as examples herein, the technology disclosed herein is applicable to other articles, e.g., hard goods, shoes, books, etc.

Figure 14:
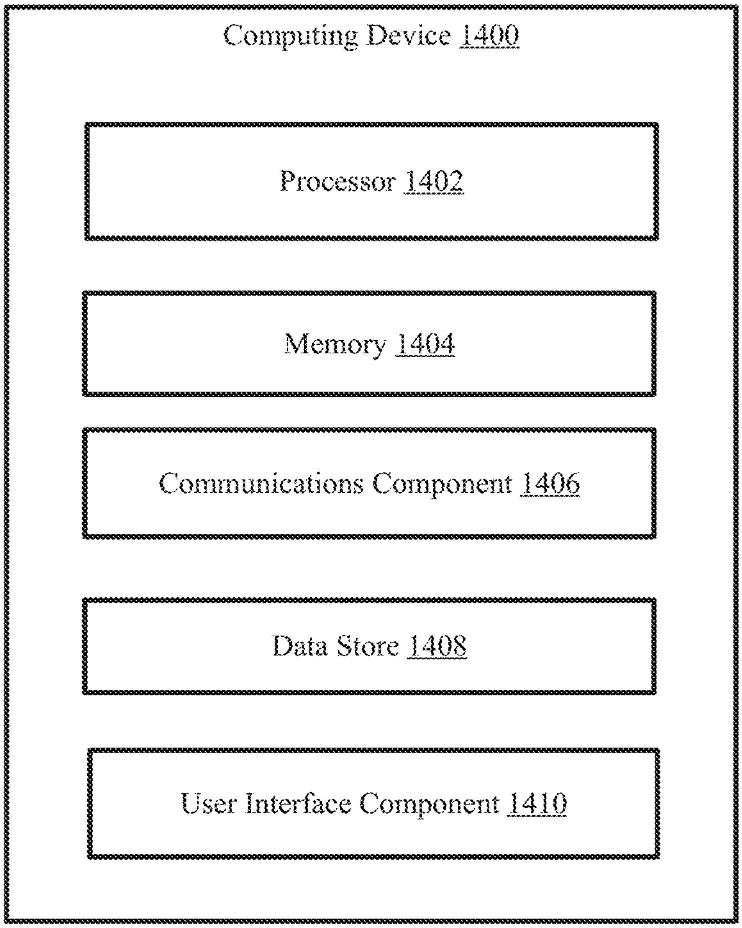
FIG. 14 is a block diagram of an example computing device which may implement all or a portion of any component of the technology disclosed herein, in accordance with examples of the technology disclosed herein.

Referring to FIG. 14, an example block diagram provides details of computing components in a computing device 1400 that may implement all or a portion of tags, readers or any other electronic component described above with reference to FIGS. 1-13. The computing device 1400 includes a processor 1402 which may be configured to execute or implement software, hardware, and/or firmware modules that perform any functionality described above with reference to FIGS. 1-13. For example, the computing device 1400 may implement tag 200, in which case the processor 1402 may be controller 210, controller 310.

The processor 1402 may be a micro-controller and/or may include a single or multiple set of processors or multi-core processors. Moreover, the processor 1402 may be implemented as an integrated processing system and/or a distributed processing system. The computing device 1400 may further include a memory 1404 (a non-transitory computer-readable medium), such as for storing local versions of applications being executed by the processor 1402, related instructions, parameters, etc. The memory 1404 may include a type of memory usable by a computer, such as random-access memory (RAM), read only memory (ROM), tapes, magnetic discs, optical discs, volatile memory, non-volatile memory, and any combination thereof. Additionally, the processor 1402 and the memory 1404 may include and execute an operating system executing on the processor 1402, one or more applications, display drivers, etc., and/or other components of the computing device 1400.

Further, the computing device 1400 may include a communications component 1406 that provides for establishing and maintaining communications with one or more other devices, parties, entities, etc., utilizing hardware, software, and services. The communications component 1406 may carry communications between components on the computing device 1400, as well as between the computing device 1400 and external devices, such as devices located across a communications network and/or devices serially or locally connected to the computing device 1400. For example, the communications component 1406 may include one or more buses, and may further include transmit chain components and receive chain components associated with a wireless or wired transmitter and receiver, respectively, operable for interfacing with external devices.

Additionally, the computing device 1400 may include a data store 1408, which can be any suitable combination of hardware and/or software, which provides for mass storage of information, databases, and programs. For example, the data store 1408 may be or may include a data repository for applications and/or related parameters not currently being executed by processor 1402. In addition, the data store 1408 may be a data repository for an operating system, application, display driver, etc., executing on the processor 1402, and/or one or more other components of the computing device 1400.

The computing device 1400 may also include a user interface component 1410 operable to receive inputs from a user of the computing device 1400 and further operable to generate outputs for presentation to the user (e.g., via a display interface to a display device). The user interface component 1410 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1410 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A secured article, comprising:

a tag set comprising a first tag and a second tag, each tag attached to the article;

a disablement structure:

attached to the article in physical proximity to the first tag, in electromagnetic relationship with the second tag, and disabling operation of the second tag absent altering the electromagnetic relationship.

2. The secured article of claim 1, wherein altering the electromagnetic relationship causes one of: enabling operation of the second tag; changing an operating characteristic of the second tag; and changing a combined operating characteristic of the combined first tag and second tag.

3. The secured article of claim 1, wherein at least one of the tags is embedded in the article.

4. The secured article of claim 1, wherein the physical proximity comprises the disablement structure and the first tag being one or more of overlapping and intersecting.

5. The secured article of claim 1, wherein the disablement structure and the first tag are attached to a label of the article.

6. The secured article of claim 1, wherein:

the first tag is embedded in the article;

the disablement structure comprises a conductive thread substantially around the first tag; and the electromagnetic relationship comprises the conductive thread in electrical connection with the second tag disabling the second tag.

7. The secured article of claim 1, wherein the disablement structure comprises a radio-frequency shielding layer.

8. The secured article of claim 1, wherein the disablement structure comprises a metal structure that electromagnetically couples at least one of inductively and capacitively to the second tag to impede the operation of the second tag via changing an impedance of the second tag.

9. The secured article of claim 1, wherein physical proximity comprises the disablement structure being i) substantially coextensive with the first tag and ii) inseparable from the first tag without disablement of the first tag and the disablement structure.

10. The secured article of claim 1, wherein the second tag is a radio frequency identification (RFID) tag.

11. An article security kit, comprising:

a first tag configured to attach to an article;

a second tag configured to attach to the article; and a disablement structure configured to attach to the article:

in electromagnetic relationship with the second tag disabling operation of the second tag absent altering the electromagnetic relationship, and in proximity to the first tag such that one or more of i) physical damage to the first tag rendering the first tag inoperable, and ii) removal of the first tag from the article, discontinues the electromagnetic relationship between the disablement structure and the second tag.

12. The kit of claim 11, wherein altering the electromagnetic relationship causes one of: enabling operation of the second tag; changing an operating characteristic of the second tag; and changing a combined operating characteristic of the combined first tag and second tag.

13. The kit of claim 11, at least one of the tags is embedded in the article.

14. The kit of claim 11, wherein the physical proximity comprises the disablement structure and the first tag being one or more of overlapping and intersecting.

15. The kit of claim 11, wherein the disablement structure and the first tag are attached to a label of the article.

16. The kit of claim 11, wherein:

the first tag is embedded in the article;

the disablement structure comprises a conductive thread substantially around the first tag; and the electromagnetic relationship comprises the conductive thread in electrical connection with the second tag disabling the second tag.

17. The kit of claim 11, wherein the disablement structure comprises a radio-frequency shielding layer.

18. The kit of claim 11, wherein physical proximity comprises the disablement structure being i) substantially coextensive with the first tag and ii) inseparable from the first tag without disablement of the first tag and the disablement structure.

19. The kit of claim 11, wherein the second tag is a radio frequency identification (RFID) tag.

20. A method comprising:

providing a kit comprising:

a first tag configured to attach to an article;

a second tag configured to attach to the article; and a disablement structure configured to attach to the article:

in electromagnetic relationship with the second tag disabling operation of the second tag absent altering the electromagnetic relationship, and in proximity to the first tag such that one or more of i) physical damage to the first tag rendering the first tag inoperable, and ii) removal of the first tag from the article, discontinues the electromagnetic relationship between the disablement structure and the second tag; and attaching the first tag and the disablement structure to the article, the disablement structure in proximity to the first tag; and attaching the second tag in electromagnetic relationship with the disablement structure, disabling operation of the second tag absent altering the electromagnetic relationship.

21. The method of claim 20, wherein altering the electromagnetic relationship causes one of: enabling operation of the second tag; changing an operating characteristic, detectable by a tag reader, of the second tag; and changing a combined operating characteristic, detectable by a tag reader, of the combined first tag and second tag.

22. The method of claim 20, at least one of the tags is embedded in the article.

23. The method of claim 20, wherein the physical proximity comprises the disablement structure and the first tag being one or more of overlapping and intersecting.

24. The method of claim 20, wherein the disablement structure and the first tag are attached to a label of the article.

25. A method comprising, in an article having attached thereto a first tag and a second tag:

inhibiting operation of the second tag while the first tag remains in operation;

un-inhibiting operation of the second tag upon the first tag becoming inoperable.

26. The method of claim 25, wherein:

inhibiting operation of the second tag comprises using a disablement structure, the disablement structure: attached to the article in physical proximity to the first tag, in electromagnetic relationship with the second tag, and disabling operation of the second tag absent altering the electromagnetic relationship.

27. The method of claim 26, wherein altering the electromagnetic relationship causes one of: enabling operation of the second tag; changing an operating characteristic, detectable by a tag reader, of the second tag; and changing a combined operating characteristic, detectable by a tag reader, of the combined first tag and second tag.

28. The method of claim 26, at least one of the tags is embedded in the article.

29. The method of claim 26, wherein the physical proximity comprises the disablement structure and the first tag being one or more of overlapping and intersecting.

30. The method of claim 26, wherein the disablement structure and the first tag are attached to a label of the article.

31. The method of claim 26, wherein:

the first tag is embedded in the article;

the disablement structure comprises a conductive thread substantially around the first tag; and the electromagnetic relationship comprises the conductive thread in electrical connection with the second tag disabling the second tag.

32. The method of claim 26, wherein the disablement structure comprises a radio-frequency shielding layer.

33. The method of claim 26, wherein the disablement structure comprises a metal structure that electromagnetically couples at least one of inductively and capacitively to the second tag to impede the operation of the second tag via changing an impedance of the second tag.

34. The method of claim 26, wherein physical proximity comprises the disablement structure being i) substantially coextensive with the first tag and ii) inseparable from the first tag without disablement of the first tag and the disablement structure.

* * * * *